(12) United States Patent
Brown

(10) Patent No.: US 7,992,470 B2
(45) Date of Patent: *Aug. 9, 2011

(54) ADJUSTABLE GRIPPING TOOL

(75) Inventor: Daniel P. Brown, Palos Park, IL (US)

(73) Assignee: Loggerhead Tools, LLC, Palos Park, IL (US)

( * ) Notice: Subject to any disclaimer, the term of this patent is extended or adjusted under 35 U.S.C. 154(b) by 1071 days.

This patent is subject to a terminal disclaimer.

(21) Appl. No.: 11/102,966

(22) Filed: Apr. 11, 2005

(65) Prior Publication Data

US 2005/0193873 A1 Sep. 8, 2005

Related U.S. Application Data

(63) Continuation-in-part of application No. 10/763,489, filed on Jan. 23, 2004, now Pat. No. 6,889,579.

(51) Int. Cl.
*B25B 13/18* (2006.01)
*B25B 13/48* (2006.01)

(52) U.S. Cl. .................. 81/90.2; 81/90.1; 81/58

(58) Field of Classification Search .............. 81/90.2, 81/58, 90.1, 90.3, 90.5, 91.1, 126, 128
See application file for complete search history.

(56) References Cited

U.S. PATENT DOCUMENTS

| | | | |
|---|---|---|---|
| 599,837 A | 3/1898 | Harris | |
| 877,773 A | 4/1908 | Holm | |
| 912,117 A | 2/1909 | Green | |
| 1,393,267 A | 10/1921 | Cousins | |
| 2,096,016 A | 10/1937 | Welshampel | |
| 2,292,391 A | 8/1942 | Merriman et al. | |
| 2,409,549 A | 10/1946 | Djidics | |
| 2,547,534 A | 4/1951 | Oliver | |
| 2,573,421 A * | 10/1951 | Feiring | 81/318 |
| 2,580,247 A | 12/1951 | Secondi et al. | |
| 2,674,911 A * | 4/1954 | Theis | 81/3.44 |
| 2,687,661 A * | 8/1954 | Richardson | 81/352 |
| 2,714,827 A | 8/1955 | Kusiv et al. | |
| 2,739,381 A | 3/1956 | Petersen | |
| 2,753,742 A | 7/1956 | Buchanan | |
| 2,787,925 A * | 4/1957 | Buchanan et al. | 72/402 |
| 2,884,826 A | 5/1959 | Bruhn | |
| 3,177,695 A | 4/1965 | Van Oort | |

(Continued)

FOREIGN PATENT DOCUMENTS

DE 2801881 1/1979

(Continued)

OTHER PUBLICATIONS

Nagel, Matthew, Examination Report for New Zealand Patent Application No. 562104, Aug. 7, 2009, Intellectual Property Office of New Zealand.

(Continued)

*Primary Examiner* — David B Thomas
(74) *Attorney, Agent, or Firm* — Vedder Price P.C.

(57) ABSTRACT

A self-energizing and de-energizing adjustable gripping tool for engaging a work piece to impart work thereto includes a first element and second element connected for relative movement. The second element includes an actuation portion having a plurality of slots. The first element includes gripping elements which are each associated with a force transfer element which engages one of the slots such that movement of the second element relative to the first element actuates the gripping elements to engage the work piece.

41 Claims, 24 Drawing Sheets

U.S. PATENT DOCUMENTS

| | | | |
|---|---|---|---|
| 3,199,334 A * | 8/1965 | Holmes et al. | 72/409.01 |
| 3,226,968 A | 1/1966 | Holmes | |
| 3,624,682 A | 11/1971 | Kowal | |
| 3,664,213 A | 5/1972 | Anati | |
| 3,672,050 A | 6/1972 | Hanback | |
| 3,713,322 A * | 1/1973 | Fischer | 72/409.09 |
| 3,901,107 A | 8/1975 | Halls | |
| 4,080,733 A | 3/1978 | Clegg | |
| 4,112,792 A | 9/1978 | Guimarin | |
| 4,277,991 A | 7/1981 | Stubenrauch | |
| 4,333,357 A | 6/1982 | Vinther | |
| 4,542,668 A | 9/1985 | Wiener | |
| 4,724,730 A | 2/1988 | Mader et al. | |
| 4,770,070 A | 9/1988 | Sowers | |
| 4,793,225 A | 12/1988 | Berkich | |
| 4,813,309 A | 3/1989 | Kang | |
| 4,847,997 A | 7/1989 | Petty | |
| 4,858,316 A | 8/1989 | Dubey | |
| 5,033,153 A | 7/1991 | Post | |
| 5,067,376 A | 11/1991 | Fossella | |
| 5,076,121 A | 12/1991 | Fossella | |
| 5,090,273 A | 2/1992 | Fossella | |
| 5,095,782 A * | 3/1992 | Galea | 81/127 |
| 5,206,996 A | 5/1993 | McDaniel | |
| 5,207,129 A | 5/1993 | Fossella | |
| 5,235,878 A | 8/1993 | Young | |
| 5,249,487 A * | 10/1993 | Armfield, IV | 81/58 |
| 5,249,490 A * | 10/1993 | Kennel | 81/405 |
| 5,261,263 A | 11/1993 | Whitesell | |
| 5,305,670 A | 4/1994 | Fossella et al. | |
| 5,345,682 A | 9/1994 | Dubinsky et al. | |
| 5,377,566 A | 1/1995 | Mandigo | |
| 5,448,931 A | 9/1995 | Fossella | |
| 5,515,609 A | 5/1996 | Sperti | |
| 5,531,549 A | 7/1996 | Fossella | |
| 5,557,993 A * | 9/1996 | Austin | 81/165 |
| 5,581,886 A | 12/1996 | Sesser et al. | |
| 5,809,852 A * | 9/1998 | Haskell | 81/129 |
| 5,819,607 A | 10/1998 | Carnesi | |
| 5,893,306 A | 4/1999 | Owoc | |
| 5,894,768 A * | 4/1999 | Malkin et al. | 81/165 |
| 5,907,906 A | 6/1999 | Sweeney | |
| 5,957,010 A | 9/1999 | Petts | |
| 5,960,683 A * | 10/1999 | Malkin et al. | 81/165 |
| 6,073,522 A | 6/2000 | Carnesi | |
| 6,098,506 A * | 8/2000 | Clegg | 81/170 |
| 6,164,107 A | 12/2000 | Korba, Jr. | |
| 6,186,034 B1 * | 2/2001 | Lamons | 81/177.9 |
| 6,227,076 B1 | 5/2001 | Murray | |
| 6,279,429 B1 * | 8/2001 | Boyer | 81/159 |
| 6,314,842 B1 * | 11/2001 | Hsieh | 81/170 |
| 6,341,544 B1 | 1/2002 | Falzone | |
| 6,401,340 B1 | 6/2002 | King | |
| 6,418,820 B1 * | 7/2002 | Lamond et al. | 81/177.1 |
| 6,530,298 B1 | 3/2003 | Steffe | |
| 6,658,739 B1 | 12/2003 | Huang | |
| 6,751,867 B1 | 6/2004 | Whyte | |
| 6,834,569 B2 * | 12/2004 | Wang | 81/133 |
| 2002/0144575 A1 | 10/2002 | Niven | |
| 2003/0121376 A1 | 7/2003 | Huang | |
| 2004/0025647 A1 * | 2/2004 | Wang | 81/133 |

FOREIGN PATENT DOCUMENTS

| | | |
|---|---|---|
| EP | 0 543 815 | 5/1992 |
| JP | S50-87599 | 12/1948 |
| JP | S56-30511 | 8/1954 |
| JP | S57-181516 | 5/1956 |

OTHER PUBLICATIONS

European Patent Office, Supplementary European Search Report issued in connection with Patent Application No. EP06749895, mailed Aug. 17, 2010, 1 page.

* cited by examiner

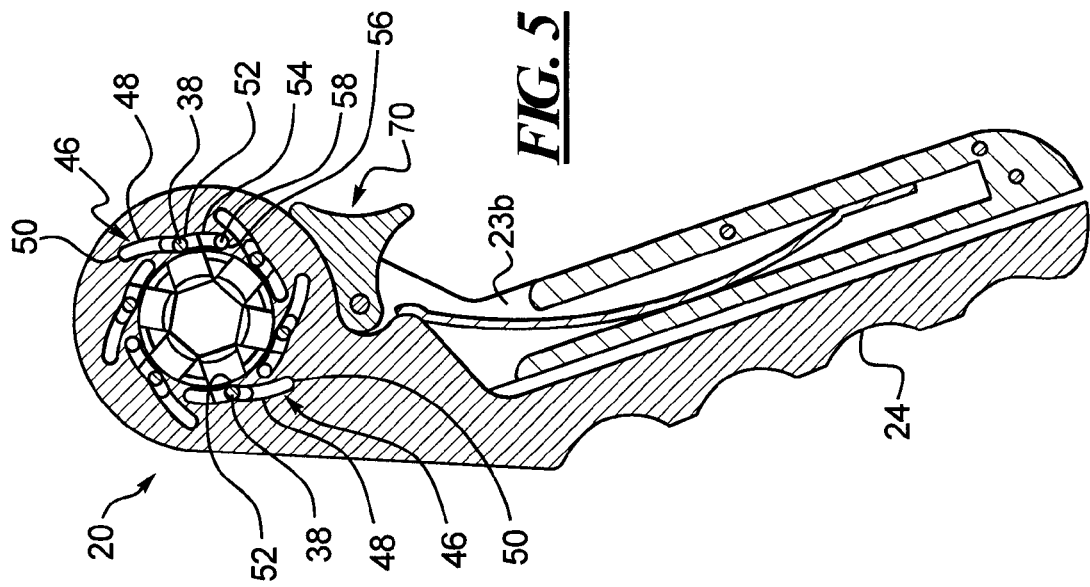
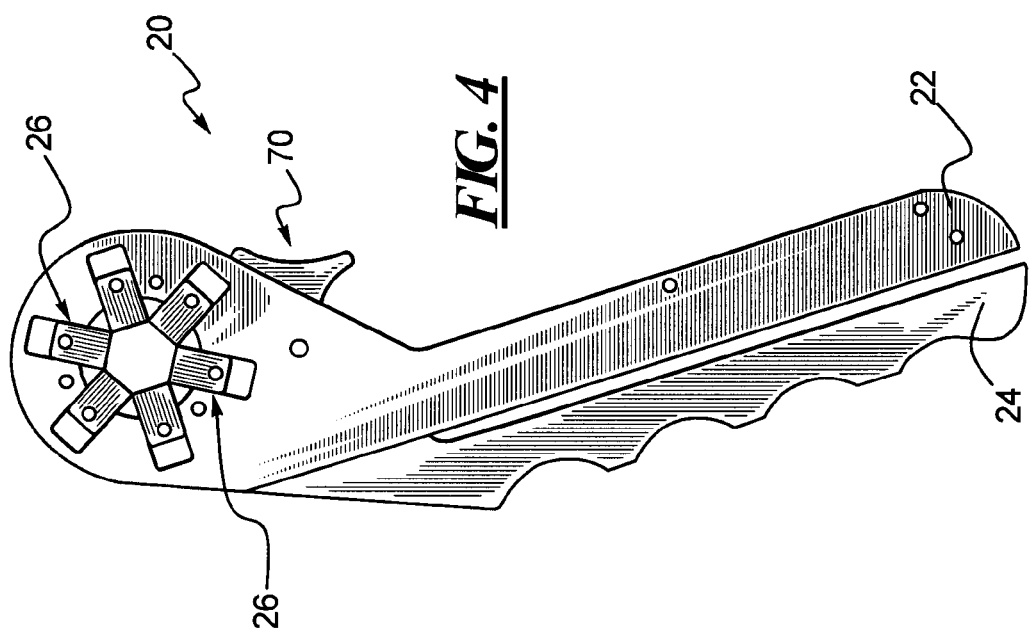

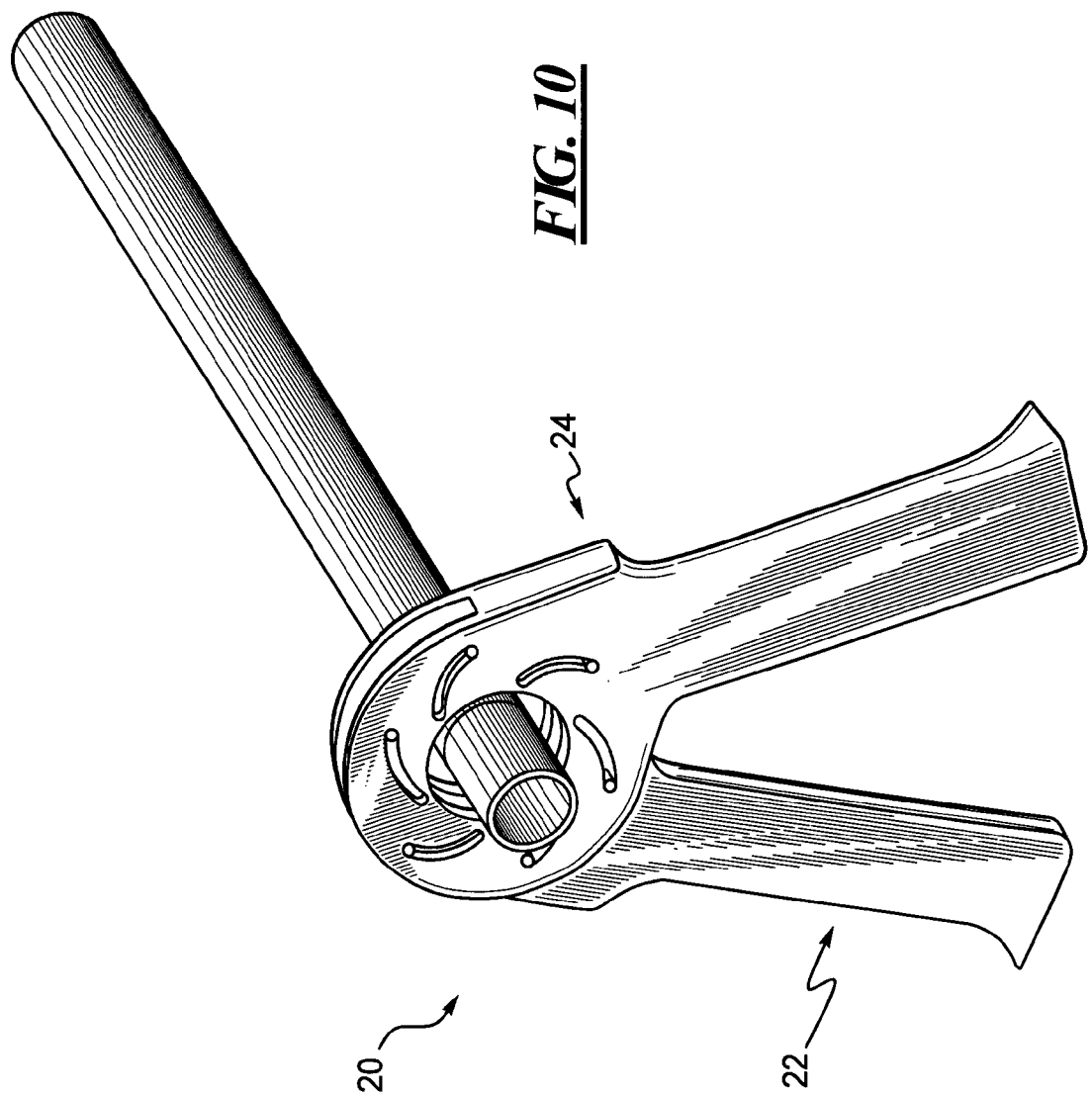

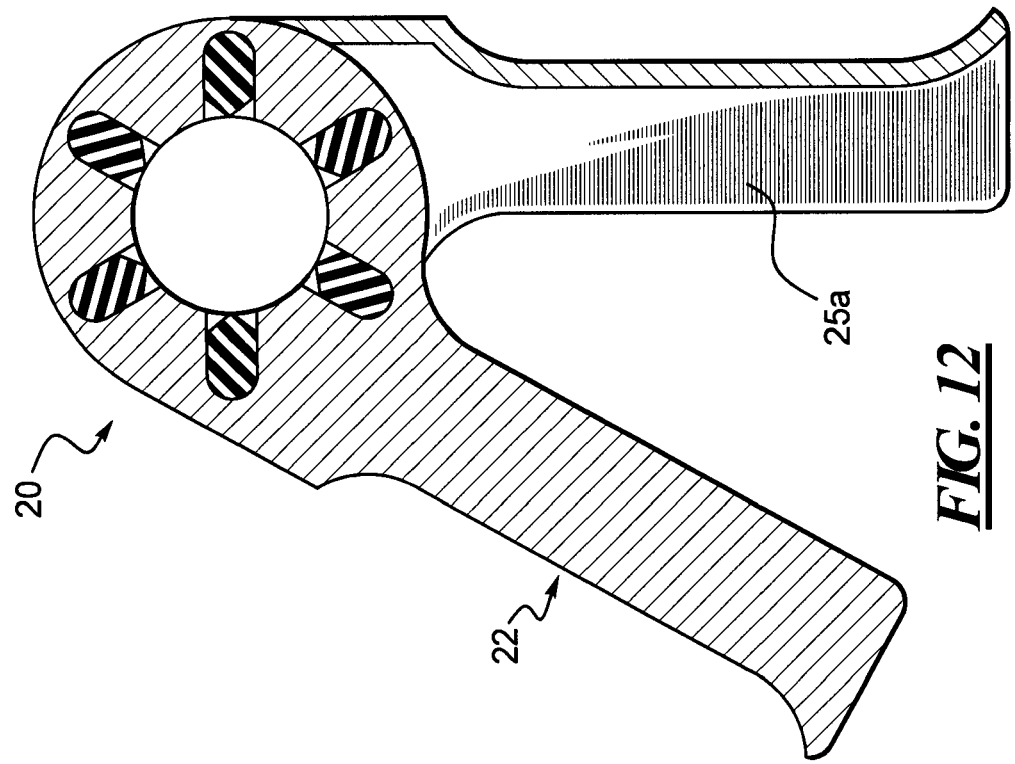
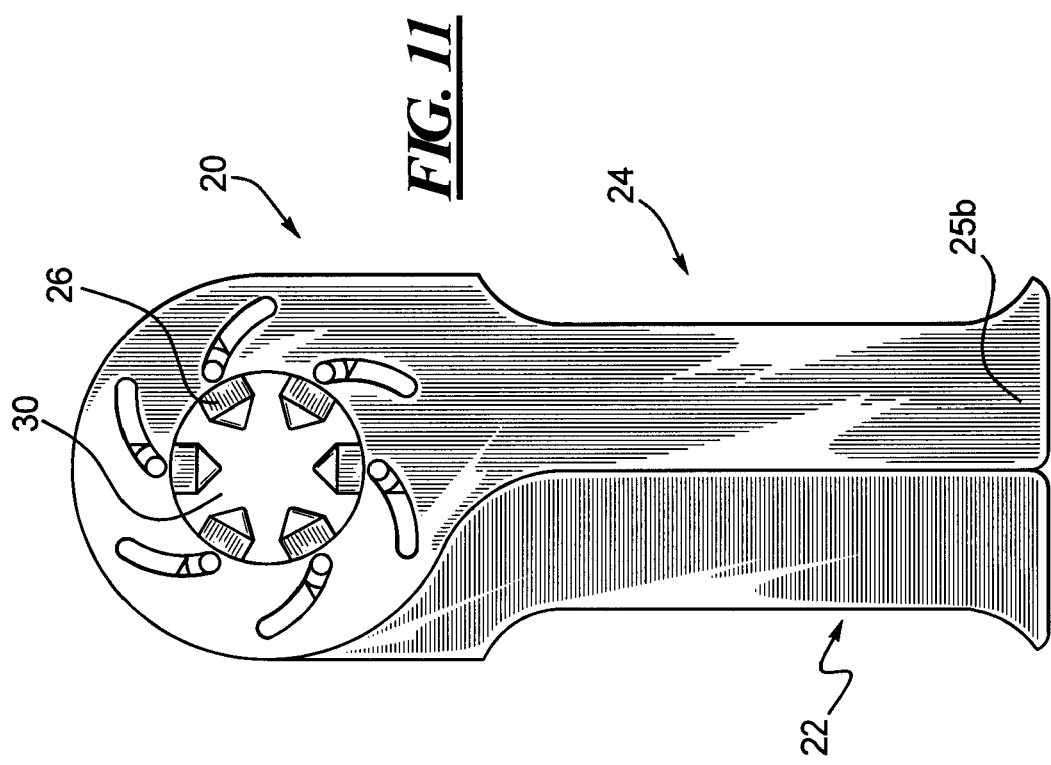

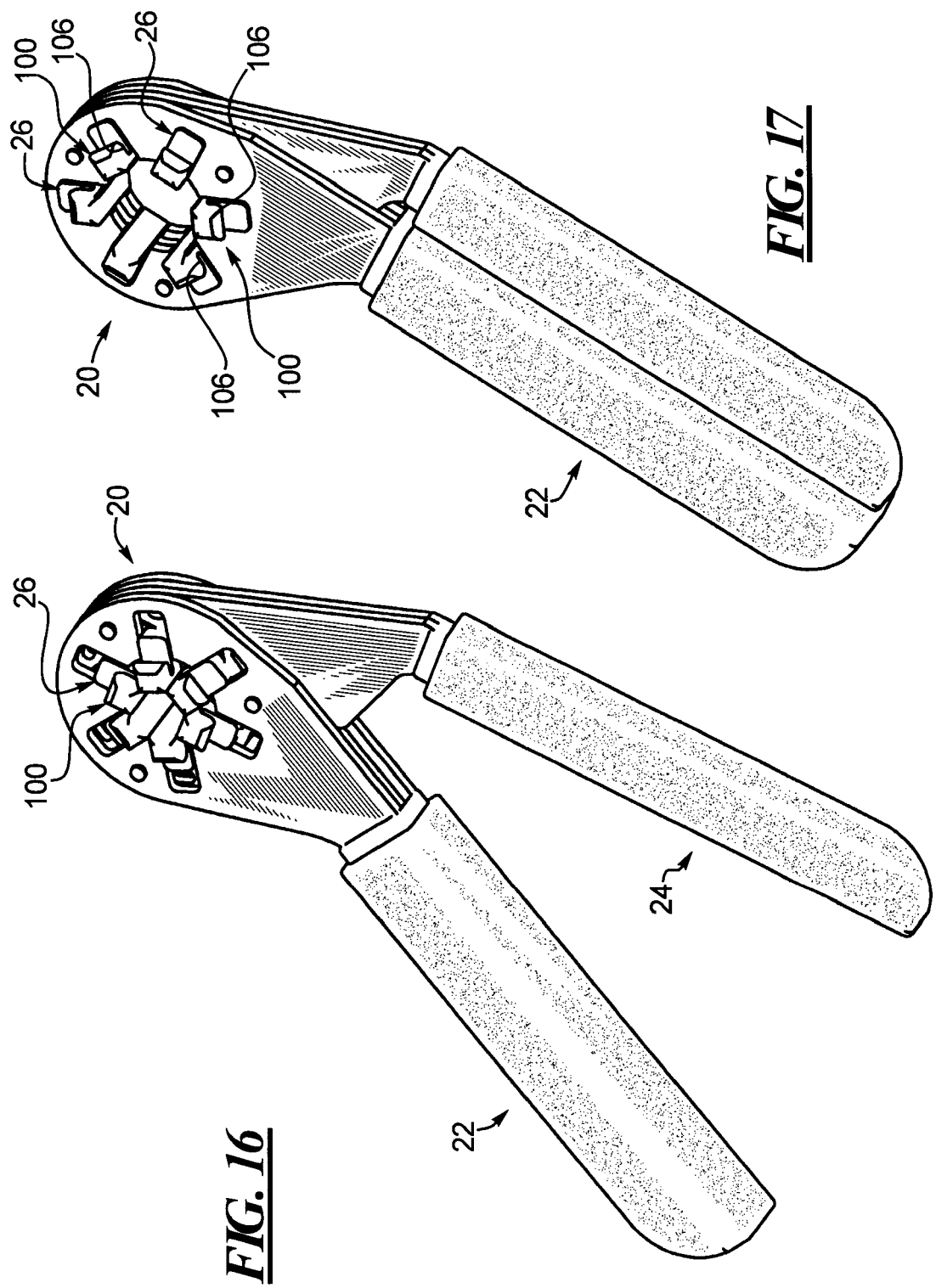

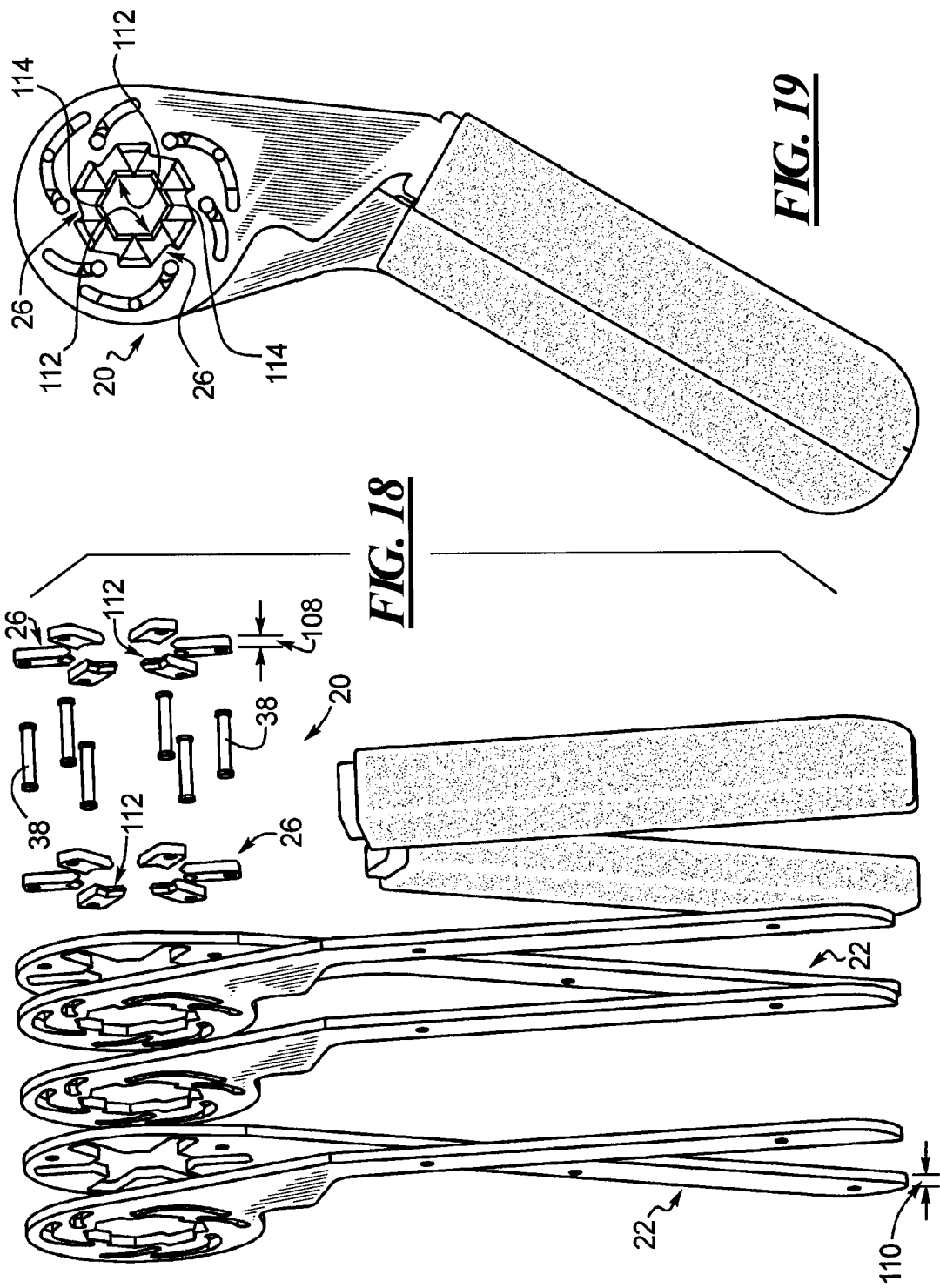

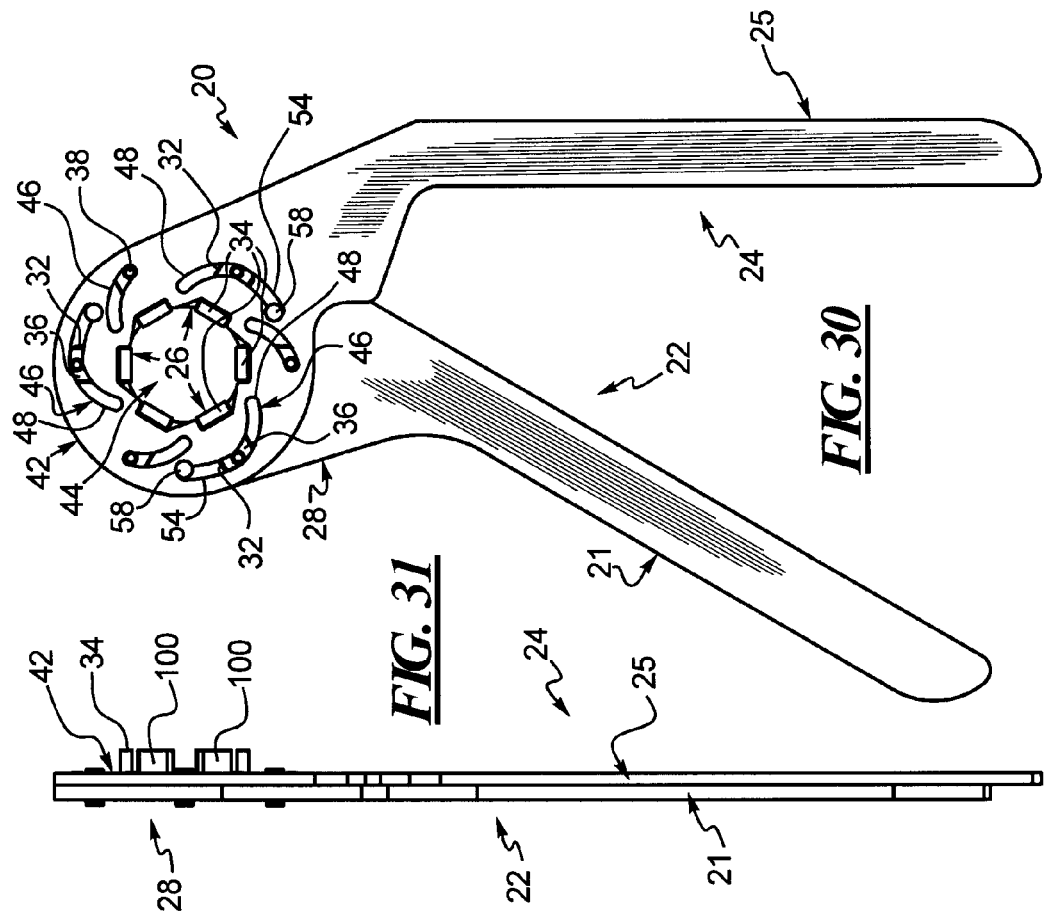
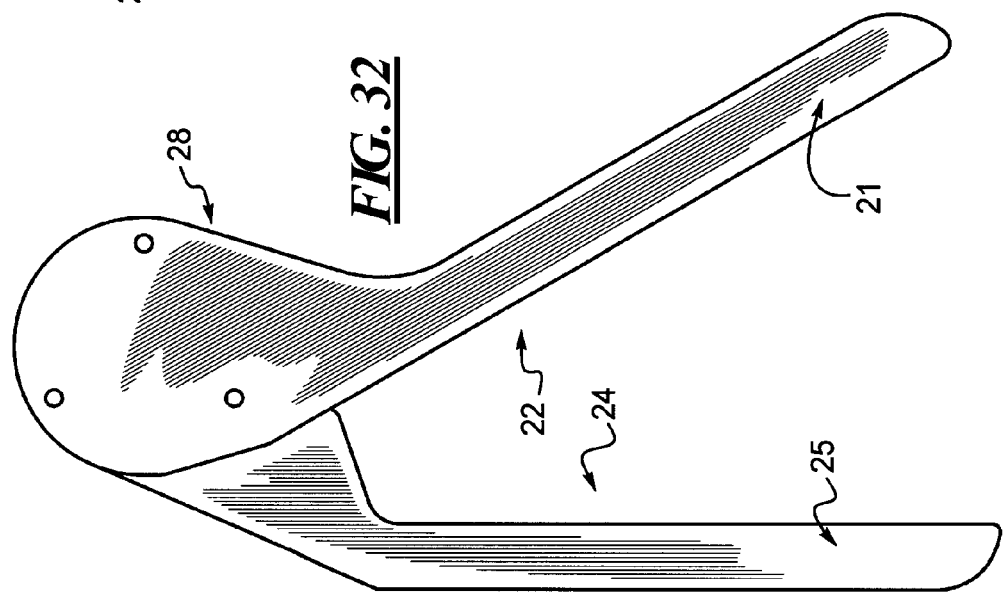

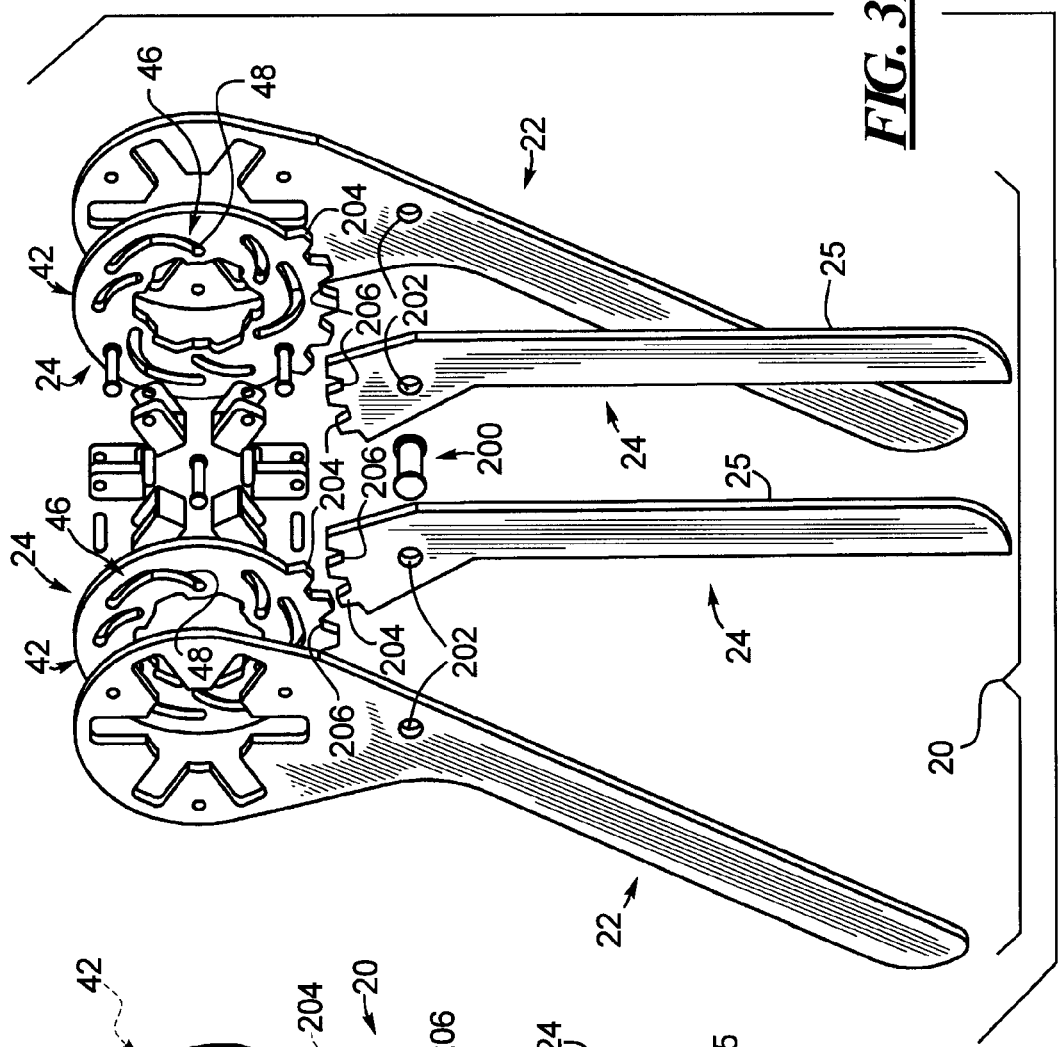
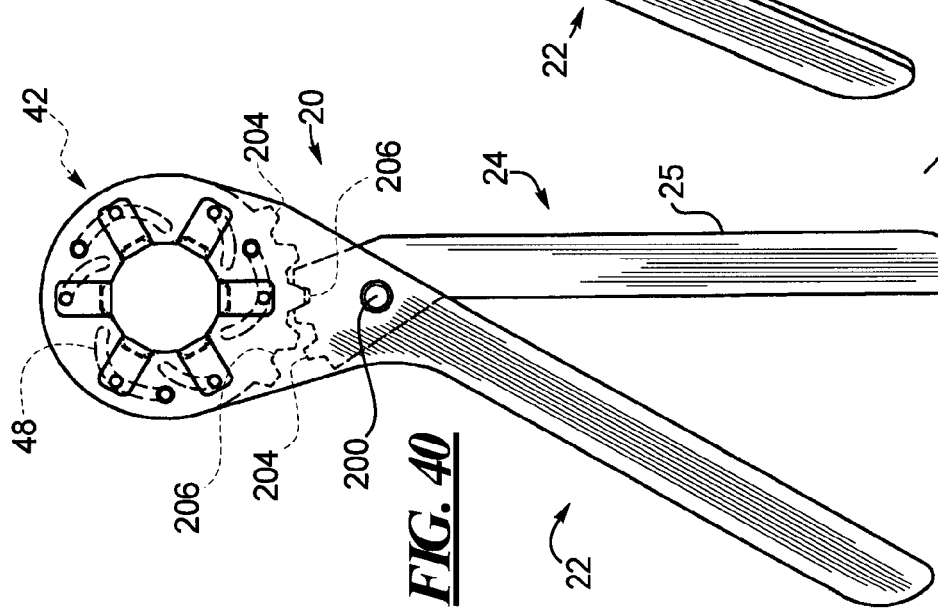

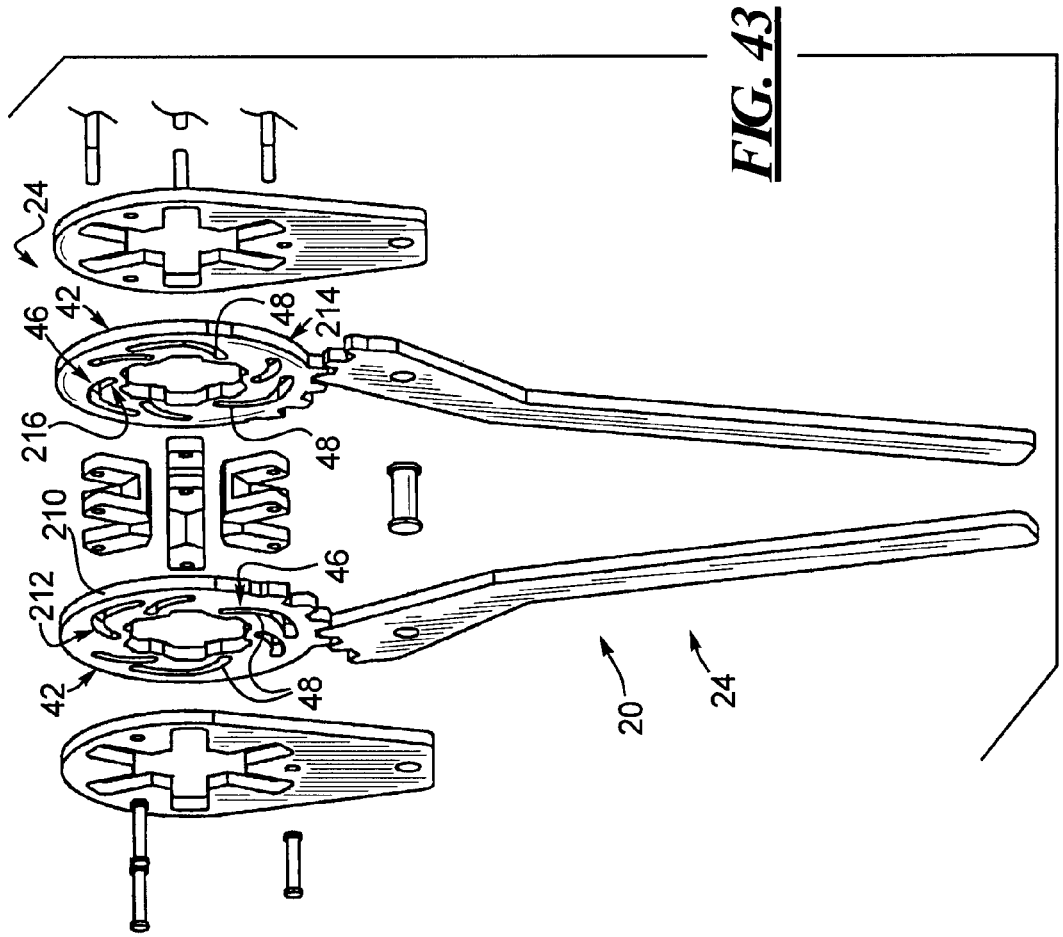
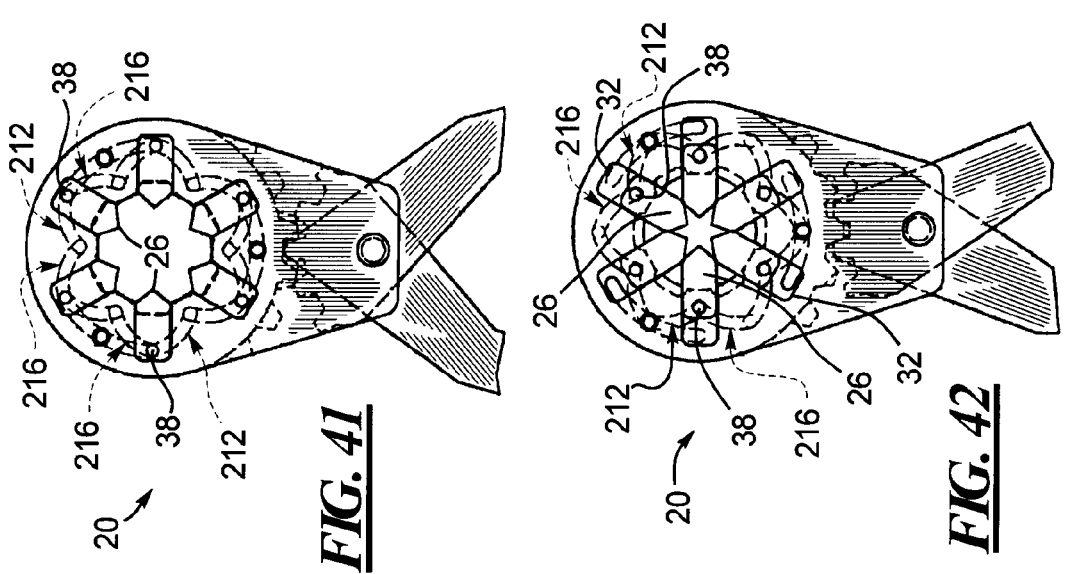

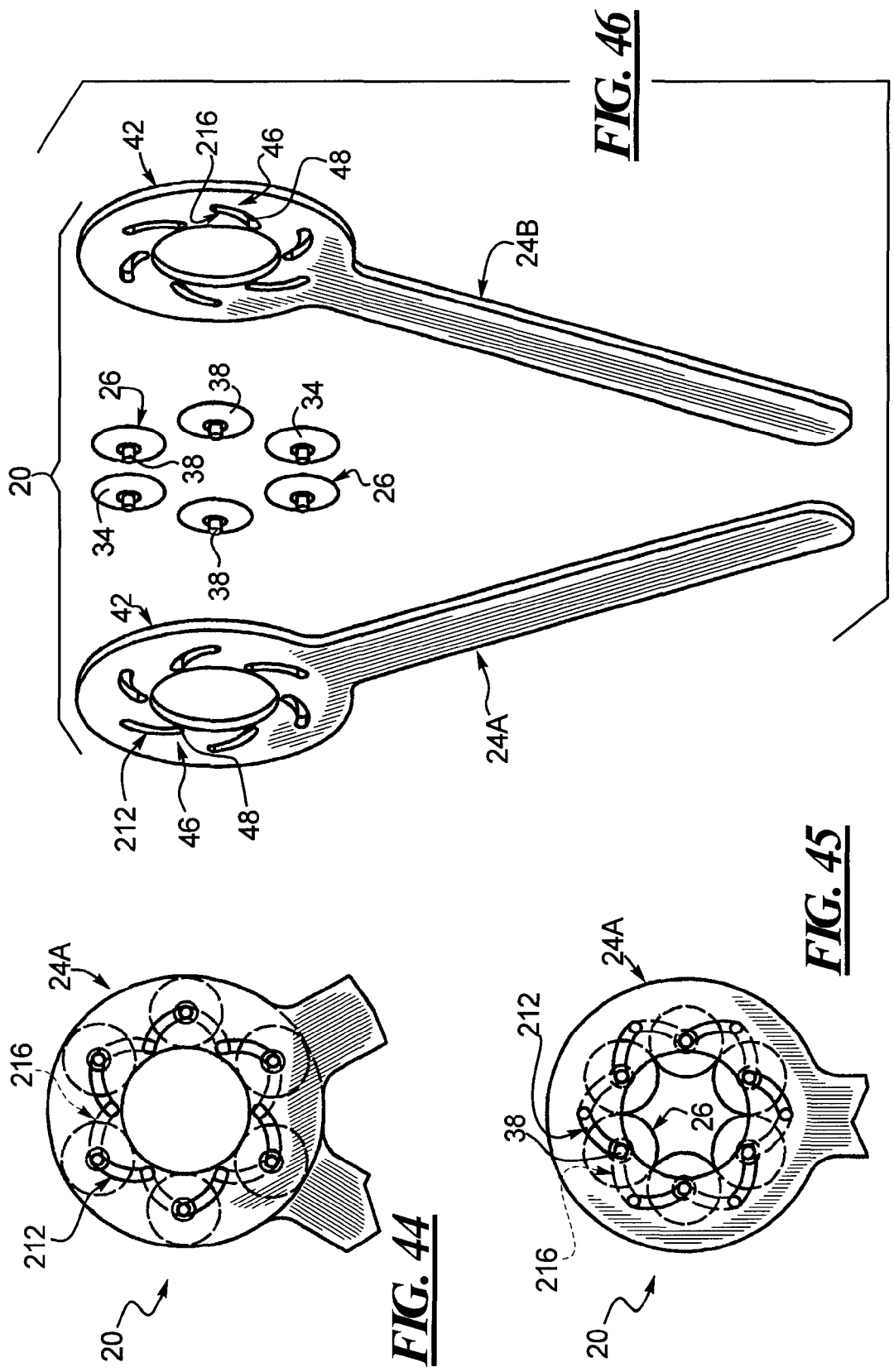

ADJUSTABLE GRIPPING TOOL

RELATED APPLICATIONS

This application is a continuation-in-part of and claims the benefit of and priority from U.S. application Ser. No. 10/763,489, filed Jan. 23, 2004, now issued as U.S. Pat. No. 6,889,579.

BACKGROUND

This disclosure pertains to a hand tool and more particularly, to an adjustable gripping tool which, as a result of manual operation, self-energizes, automatically configures to engage differently dimensioned and shaped work pieces and de-energizes upon release of actuating force.

Various types of adjustable gripping tools are known in the art. Specifically, several known adjustable gripping tools are embodied in the form of a "crescent" wrench, an adjustable socket wrench, pipe wrench, vice grips, crimpers, bolt and nut cutters, pipe and tube cutters, and various other "plier-type" gripping tools. A crescent wrench is an adjustable open end wrench that has stationary rotatable screw which engages a toothed rack formed on a first jaw element movable with respect to the second jaw element extending from the first element. The adjustable socket wrench includes a shell housing movable elements, such that movement of the first element with respect to the shell causes the elements to move with respect to the shell in order to engage the work piece. One cutting tool version has adjustable cutting jaws that when tightened and rotated around a tube score and cut the tube. Another version of the cutting tool uses a blade cutting mechanism. The plier-type devices include a pair of first elements connected in such a manner so as to move at least two jaws toward one another in order to engage the work piece. The crimping tools provide various functions, such as specialty segmented dies that expand or contract via interaction of a tapered boy with a fixed diameter or a plier-type device crimper with jaws that have been modified as a special head to crimp the work piece.

Each of the prior art devices has disadvantages. The crescent wrench is not automatically resizable during use. The socket device is limited in its effective range of dimensional capability. In other words, a large number of sockets is needed to service a relatively standard range of work pieces, the work pieces must have a standard configuration and the work pieces must be engaged axially.

The plier-type devices fail to engage the work piece evenly around or within the circumference with proper offsetting forces and stability which aides in operation of the tool. The plier-type devices also concentrate the applied mechanical forces in a point-loading configuration creating pressure points and stress risers on the work piece surface.

The tube cutting devices cannot be used with one hand. Another disadvantage of tube cutting devices, in particular, knife blade cutters, is that the tubing is often distorted as a result of the asymmetrical cutting forces applied by the blade against the tube. Other tube cutting devices, such as screw-and-wheel-type tube cutters require continuous rotation of the cutting wheel around the circumference of the tube while simultaneously increasing the force applied by the cutting wheel to the tube in order to increase the cutting depth.

Prior art crimping devices cannot create symmetrically balanced crimps with a simple hand tool. For example, crimping a metal sleeve on a hydraulic hose requires a press and a proper die for proper application. Also all of the previously available gripping tools either loosely hold the work piece or hold the work piece in a manner that concentrates and focuses the gripping forces in a point pressure-loading configuration. This concentration of gripping forces on certain points oftentimes deforms the work piece. Also the previously available tools for wrench applications could not be easily sized to the work piece.

Therefore, there exists a need in the art for an adjustable gripping tool which, as a result of manual operation, self-energizes the tool action, may be automatically sized and resized to engage a work piece, de-energizes upon release of actuation force, that has a broad range of dimensional capability, engages work pieces axially and radially and provides offsetting forces for stability in operation. Beyond the ability to resize the gripping range, the gripping tool of the present disclosure symmetrically translates the force applied to the gripping tool onto the work piece in a symmetrically balanced and mechanically advantaged and efficient way. Thus, an even distribution of gripping and rotational force about the work piece is achieved; whereby allowing for the most efficient distribution of mechanical stress about the work piece. For any given force required to manipulate the work piece the present disclosure will accomplish the work with the minimal distortion of the work piece by distributing the work force over the largest area of the work piece. Other advantages of the adjustable gripping tool of the present disclosure include decreased costs, increased productivity and multi-access engagement of the work piece resulting in a mechanically advantaged, efficient, even and balanced distribution of working forces.

BRIEF DESCRIPTION OF THE DRAWINGS

Certain embodiments are shown in the drawings. However, it is understood that the present disclosure is not limited to the arrangements and instrumentality shown in the attached drawings, wherein:

FIG. 4 is a top plan view of the adjustable gripping tool of FIG. 1 disposed in a closed or second operative position.

FIG. 5 is a sectional view of the adjustable gripping tool of FIG. 4 taken along a line passing through a second element of the adjustable gripping tool.

FIG. 10 is a perspective view of another embodiment of an adjustable gripping tool in accordance with the principles of the present disclosure.

FIG. 11 is a top plan view of the adjustable gripping tool of FIG. 10, disposed in a closed or second operative position.

FIG. 12 is a sectional view of the adjustable gripping tool of FIG. 11 taken along a line passing through the second element of the adjustable gripping tool.

FIG. 16 is a perspective view of another embodiment of an adjustable gripping tool in accordance with the principal aspects of the present disclosure.

FIG. 17 is a perspective view of the adjustable gripping tool of FIG. 16.

FIG. 18 is an exploded view of another embodiment of an adjustable gripping tool in accordance with the principal aspects of the present disclosure.

FIG. 19 is a top plan view of the adjustable gripping tool of FIG. 18.

FIG. 30 is a top plan view of another embodiment of an adjustable gripping tool in accordance with the principal aspects of the present disclosure.

FIG. 31 is side elevation view of the adjustable gripping tool of FIG. 30.

FIG. 32 is a bottom plan view of the adjustable gripping tool of FIG. 30.

FIG. 39 is an exploded view of another embodiment of an adjustable gripping tool in accordance with the principal aspects of the present disclosure.

FIG. 40 is a top plan view of the adjustable gripping tool of FIG. 39.

FIG. 41 is a top plan view of another embodiment of an adjustable gripping tool in accordance with the principal aspects of the present disclosure.

FIG. 42 is another top plan view of the adjustable gripping tool of FIG. 41.

FIG. 43 is an exploded view of the adjustable gripping tool of FIGS. 41 and 42.

FIG. 44 is a top plan view of another embodiment of an adjustable gripping tool in accordance with the principal aspects of the present disclosure.

FIG. 45 is another top plan view of the adjustable gripping tool of FIG. 44.

FIG. 46 is an exploded view of the adjustable gripping tool of FIGS. 44 and 45.

DETAILED DESCRIPTION OF A PREFERRED EMBODIMENT OF THE DISCLOSURE

Figure 1:
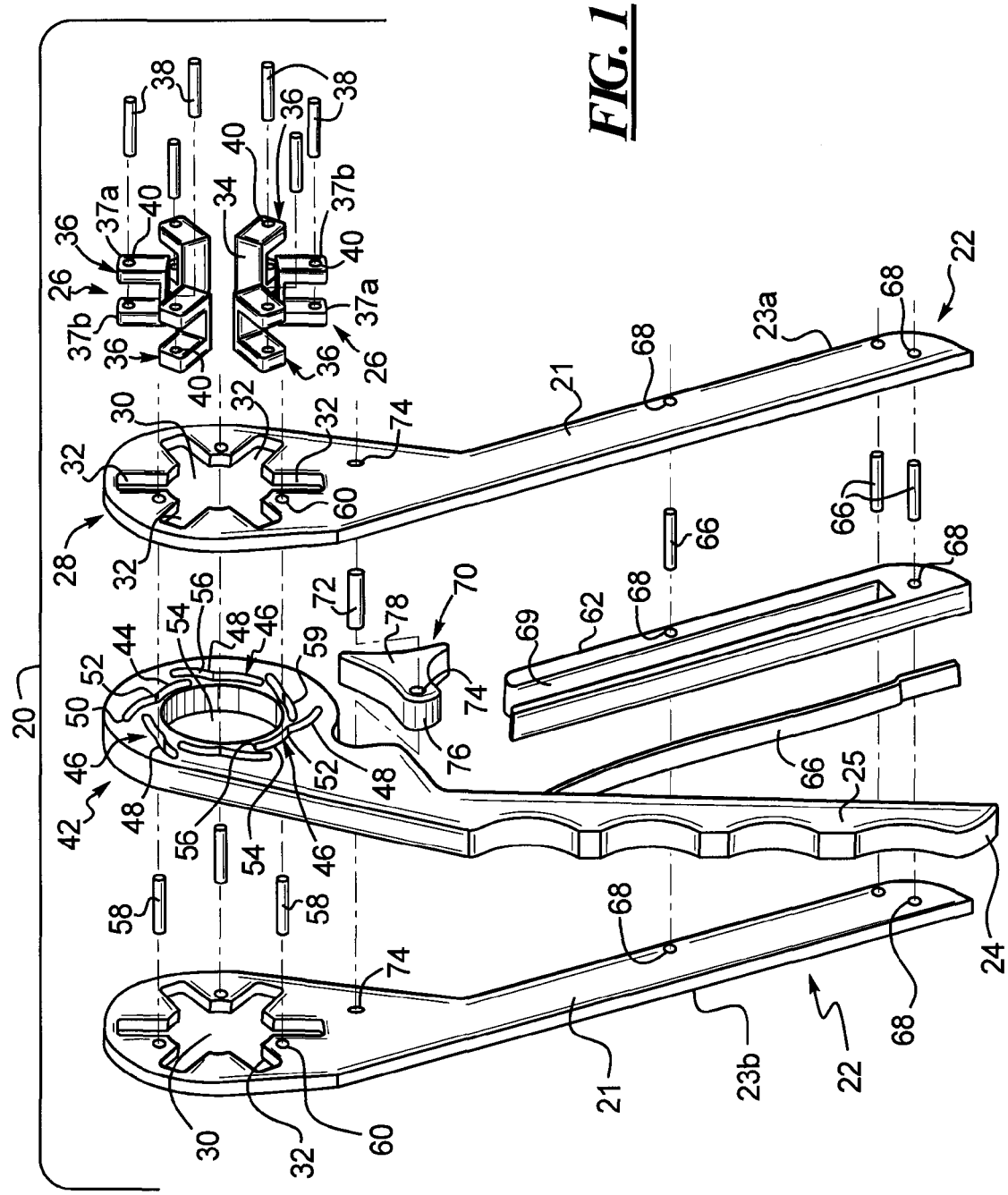
FIG. 1 is an exploded perspective view of an adjustable gripping tool in accordance with the principles of the present disclosure.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

One principal aspect of the present disclosure is directed to an adjustable gripping tool for engaging a work piece to impart work thereto. The gripping tool includes a first element and a second element connected for a relative movement to generate movement of at least one gripping element. The first element includes a gripping portion configured to engage the work piece including at least one guide and at least one gripping element. Each at least one gripping element may include a body portion adapted for engaging a work piece, an arm portion configured to engage one of the guides and/or a force transfer element contiguous with the arm portion. The second element includes an actuation portion generally aligned with the first element and having at least one slot. Each at least one slot has a section configured to engage one of the force transfer elements such that movement of the second element with respect to the first element actuates each at least one section to contact and move each respective force transfer element thereby actuating each said at least one gripping element along respective at least one guide.

FIG. 1 illustrates in an exploded perspective view of the adjustable gripping tool 20 in accordance with principles of the present disclosure. The adjustable gripping tool 20 primarily includes a first element 22 and a second element 24 connected for relative movement. In one embodiment of the present disclosure, the first element 22 includes a pair of elements 23A, 23B disposed on opposing sides of the second element 24. It is within the teachings of the present disclosure that the first element 22 may be configured with a single element 23A or 23B, or as a pair of elements 23A, 23B as may be desired with respect to other design factors of importance to one of skill in the art. The first element 22 includes a first grasping portion 21 and the second element 24 includes a second grasping portion 25. The first and second grasping portions 21, 25 are formed substantially as and commonly referred to as a handle of a tool. The relative movement between the first element 22 and the second element 24 generates, in one embodiment, generally linear movement of the gripping elements 26.

The first element 22 further includes a gripping portion 28, formed substantially as and commonly referred to a head of a tool, disposed at one end of the first grasping portion 21 and configured to engage the work piece (not shown, see for example only and not by way of limitation FIGS. 10, 14, 15 and 20) including a first opening 30, a plurality of guides 32 extending radially from the first opening 30 and the gripping elements 26. It is within the teachings of the present disclosure that the guides 32 may be formed in any suitable configuration. For example, the guides may be formed as groves, channels or any other suitable configuration. Not by way of limitation, but such structural configuration is often guided by manufacturing methods or capabilities. Additionally, the guides 32 may be curvilinear or linear. The gripping elements each include a body portion 34 adapted for engaging the work piece, an arm portion 36 configured to engage one of the guides 32 and a force transfer element 38 contiguous with or preferably connected to the arm portion 36. It is within the teachings of the present disclosure that the gripping elements may be integrally formed in any suitable manner. It will also be recognized that the gripping elements may be formed in any other suitable manner as desired to achieve any intended purpose or function. Examples of such other configurations or formations will be disclosed below, but shall not be considered limiting in any sense.

In one embodiment of the present disclosure, the arm portion 36 of the gripping elements 26 further includes a pair of arms 37A, 37B disposed at opposite ends of the body portion 34 such that the gripping elements 36 are substantially U-shaped. It will be recognized by those of skill in the art that the pair of arms 37A, 37B, when so provided engaged the respective guides 32 formed in the first element elements 23A, 23B, respectively. The pair of arms 37A, 37B each include an aperture 40 aligned such that one of the force transfer elements 38 is contiguous therewith for positioning and actuation of the gripping elements 26 as detailed below.

It is within the teachings of the present disclosure that the gripping elements may have a smooth or rough face with which to engage the work piece, as desired. For example, the rough face may have a grooved, serrated, checked or any other suitable finish. Furthermore, the force transfer elements 38 may be configured as pins or other suitable structure to provide the functions as described herein. Moreover, the first element and/or each of the elements thereof may often be referred to as a handle and the second element may often be referred to as a lever. It will be recognized by those of skill in the art that the terms used herein are not of a limiting sense. Rather, these terms are used to broadly describe the structure and function herein.

The second element 24 further includes an actuation portion 42, formed substantially as and commonly referred to as a head of a tool, disposed at one end of the second grasping portion 25 and having a second opening 44 preferably concentric with the first opening 30 and a plurality of slots 46 disposed adjacent the second opening 44. It will be recognized by those of skill in the art that the first and second openings need not be precisely concentric in order to operate as disclosed and provided the intended function. Rather, references to concentric alignment shall include any alignment of the first and second elements which permits operation as disclosed. In one embodiment, each of the slots 46 has a first section 48 configured to engage one of the force transfer elements or pins 38 such that movement of the second element 24 with respect to the first element 22 simultaneously actuates the first sections 48 to contact and move the force transfer elements 38 along a path defined by the first section thereby actuating the gripping elements 26 along the guides 32. It will be recognized by those of skill in the art that in this embodiment the first sections 48 define a path which generally decreases in terms of radial measurement from a center of the second opening 44 from a first outer end 50 to an inner end 52. In another embodiment, the paths may generally increase in terms of radial measurement from the center of the second opening 44 such that relative movement between first and second elements generates an outward motion of the gripping elements. Alternatively, the guides, slots and force transfer element may be configured to interact in a number of different ways to move the actuation elements into movement with the gripping or work piece engaging elements. For example, a pair of slots may be formed in a pair of cooperative first and/or second elements where each slot defines an arcuate path that simultaneously act on the force transfer element to effect movement of the gripping element, as described in further detail herein.

In one embodiment, each of the slots 46 further includes a second section 54 extending from the first section 48. It will be recognized by those of skill in the art that the second section 54 defines a path which is generally consistent in terms of radial measurement from the center of the second opening 44 from the inner end 52 to a second outer end 56.

In one embodiment of the present disclosure, the first element 22 further includes a plurality of aligning elements 58 for engaging the second sections 54 and where the two elements 23A, 23B are used for positioning and interconnecting the elements 23A, 23B of the first element 22. Each aligning element 58 is disposed between an adjacent pair of guides 32 and extends parallel to the force transfer element 38. Apertures 60 are formed in the first elements 23A, 23B to receive and engage the aligning elements 58. In operation, each one of the aligning elements 58 engages one of the second sections 54 so that during relative movement between the first element 22 and the second element 24, or first and second elements, respectively, the first and second openings 30, 44 remain generally aligned. It will be recognized by those of skill in the art that the second sections 54 engage the aligning elements 58 in response to the forces induced by the divergent path of the first sections 48 on the force transfer elements 38. As a result, not only do the first and second openings 30, 44 remain generally concentrically aligned, but the gripping elements 26 are actuated along the guides 32 with equal, likewise displacement. It is within the teachings of the present disclosure that the slots 46 may include a third section defined within the first section. The third section facilitates actuating a respective gripping element at a different rate. It will be recognized by those of ordinary skill in that art that such configuration will be advantageous when timing of engagement between the gripping elements and the work piece is desired. For example, a third section may be used in a crimping operation wherein at least one of the slots includes a first section and a third section and at least one of the slots includes a first section. All the gripping elements are initially actuated by the first section of each slot. However, those gripping elements associated with the third section will be moved at a different rate as dictated by the third section. Such different rate may increase, decrease or maintain the timing of engagement with the work piece. Those gripping elements not associated with the third section continue to move as per the first section. Accordingly, the third section gripping elements hold the work piece while the first section gripping elements further act on the work piece by piercing or any other desired action.

Figure 3:
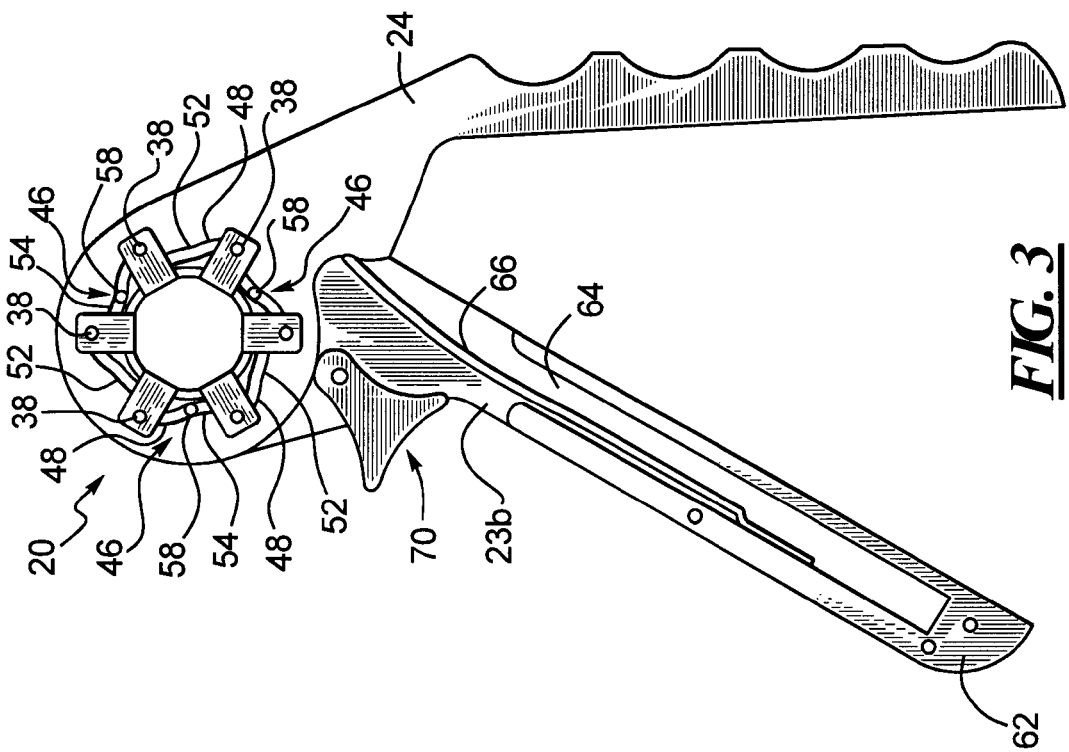
FIG. 3 is a sectioned view of the adjustable gripping tool of FIG. 2 wherein one component of a first element has been removed.
Figure 2:
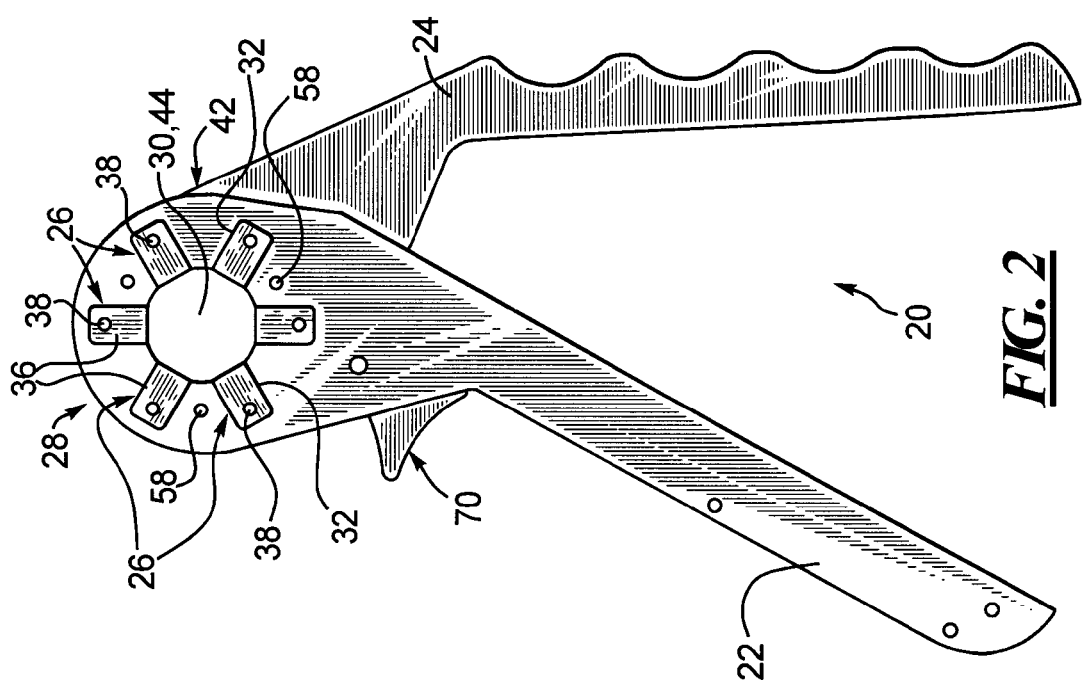
FIG. 2 is a top plan view of the adjustable gripping tool of FIG. 1 disposed in an open or first operative position.

A spacer 62 may be used to interconnect the elements 23A, 23B to define a pocket 64 such that a spring 66 disposed within the pocket contacts the second element 24 in order to dispose the second element in a normally open position (see FIGS. 2 and 3). The spacer may be connected to each of the elements 23A, 23B by press fit pins 66 engaging aligned apertures 68 or any other suitable device or in any other suitable manner.

A lock mechanism 70 is connected to the first element 22 such that operative movement of the lock mechanism 70 from a first operative position (see FIGS. 4 and 5) to a second operative position (see FIGS. 2 and 3) secures the first element 22 and second element 24 in any desired orientation. The lock mechanism 70 may be connected between the elements 23A, 23B by a press fit pin 72 engaging aligned apertures 74 or by any other suitable device or in any other suitable manner. The inner or operative end 76 of the lock mechanism 70 is configured as a cammed or eccentric surface. In one embodiment, this may be achieved by disposing aperture 74 offset from the longitudinal axis of the lock mechanism 70. Alternatively, an eccentric shaped surface may be defined on the inner or operative end 76 or by any other suitable manner.

When oriented in the first operative position (See FIGS. 4 and 5), the inner end 76 of the lock mechanism 70 defines a clearance (82, see FIG. 6) with respect to the second element 24. Movement of the actuating end 78 of the lock mechanism 70 from the first operative position to the second operative position (See FIGS. 2 and 3) moves the inner end 76 about the aperture 74 such that the operative end 76 binds against the second element 24 thereby securing the first element and second element in a desired orientation. It is within the teachings of the present disclosure that the lock mechanism may be formed with any suitable structure for the desired functionality. For example, in one embodiment, the lock mechanism may include cooperative, complimentary saw-tooth, grooved or geared surfaces that facilitate an interference fit so that the tool may be used to impart work to the work piece with either a clockwise or a counter-clockwise orientation. Any other suitable structure which would facilitate an interference fit would be useful and/or desireable.

In one embodiment of the present disclosure, the gripping portion 28 includes six gripping elements 26. However, it would be recognized by those of skill in the art, that the gripping portion 28 need include only at least one gripping or engaging element 26 and that any other suitable number of gripping or work piece engaging elements may be provided. In the embodiment with six gripping elements, the adjustable gripping tool may be advantageously used in connection with hex-shaped work pieces where the gripping elements face-load each of the flats of the work piece. Such a configuration is advantageous compared to conventional inventors that point-load a hex-shaped fastener at its corners.

FIG. 2 illustrates the adjustable gripping tool of FIG. 1 disposed in an open position. The second element 24 is biased from the first element 22 as described above to maintain such open position. The lock mechanism 70 is disposed in the second operative position securing the first element 22 and second element 24 a desired orientation. The adjustable gripping tool 20 of this embodiment is configured such that the gripping portion 28 and the actuation portion 42 are adapted to circumferentially engage the work piece. However, in FIG. 2, the gripping elements 26 are disposed such that the arms 36 engage the guides 32 in a manner which is characteristic of the open position of the adjustable gripping tool 20. The force transfer elements 38 and aligning elements 58 are shown as force transfer elements press fit to the gripping elements 26 and first element 22 respectively. Alternatively, the force transfer elements can be manufactured as a protrusion of the gripping or work piece engaging element.

FIG. 3 illustrates a section view of the adjustable gripping tool 20 of FIG. 2 wherein one element of the first element 22 has been removed. Element 23B is shown having spacer 62 connected thereto to define a pocket 64 such that the spring 66 disposed within the pocket 64 contacts the second element 24 to bias the second element 24 in the open position. As described above, the lock mechanism 70 is engaged in the second operative position securing the first element 23B and second element 24 in the desired open position. Aligning elements 58 are disposed at the inner end 52 of the slot 46 which defines a point of separation between the first section 48 and the second section 54. The force transfer elements 38 are disposed at the outer end 50 of the first section 48 of the slot 46 as will be shown and described in more detail below.

FIG. 4 illustrates an adjustable gripping tool 20 disposed in a closed position wherein the first element 22 and second element 24 are disposed immediately adjacent. The lock mechanism 70 is disposed in the first operative position, unlocked. The gripping elements 26 have been moved from an open position, as shown in FIGS. 2 and 3, to a closed position such that the gripping elements are adapted for engaging the work piece.

FIG. 5 illustrates a section view of the adjustable gripping tool 20 of FIG. 4 taken through the second element where the adjustable gripping tool is disposed in the second operative or closed position. The first element is represented by element 23B which is disposed immediately adjacent the second element 24. The force transfer elements 38 have been moved as a result of contact with the first section 48 of the slots 46 from an outer end 50 to an inner end 52. The aligning elements 58 have been moved from an inner end from the second section 54 of the slot 56 to an outer end 56. It will be recognized by those of skill in art that the paths defined by the first and second sections 48, 54 of the slot 46 are divergent. The aligning elements 58 engage the second portion 54 of the slot 46 in order to maintain proper orientation between the first element 22 and the second element 24. The force transfer elements 38 engage the first portion 48 of the slot 46 such that the generally decreasing diameter dimension of the path defined by the first portion 48 causes the force transfer elements to move closer to the center of the first and second openings 30, 44. Accordingly, the gripping elements 26 are likewise actuated along the guides 32 to engage the work piece. The lock mechanism 70 is disposed in a first operative position. It should also be noted that the slots can be reversed and the action reversed such that the actuation elements are radiating from the center during activation.

Figure 6:
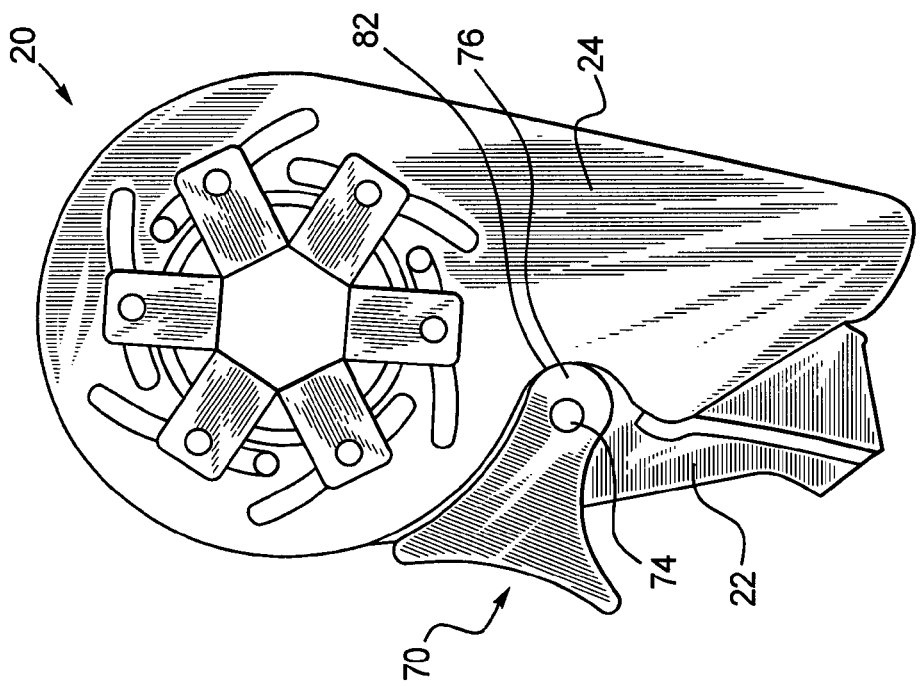
FIG. 6 is a detailed broken-away section view of the adjustable gripping tool of FIG. 6 wherein one component of the first element has been removed.

FIG. 6 illustrates a detailed broken away view of the adjustable gripping tool 20 of FIGS. 4 and 5. The lock mechanism 70 is disposed in a first operative or open position. The lock mechanism 70 is connected to the first element 22 by a pin 74 which is disposed offset from a longitudinal axis of the lock mechanism 70, such that in this first operative position, a clearance 82 is defined between the lock mechanism operative or inner end 76 and the second element 24.

Figure 7:
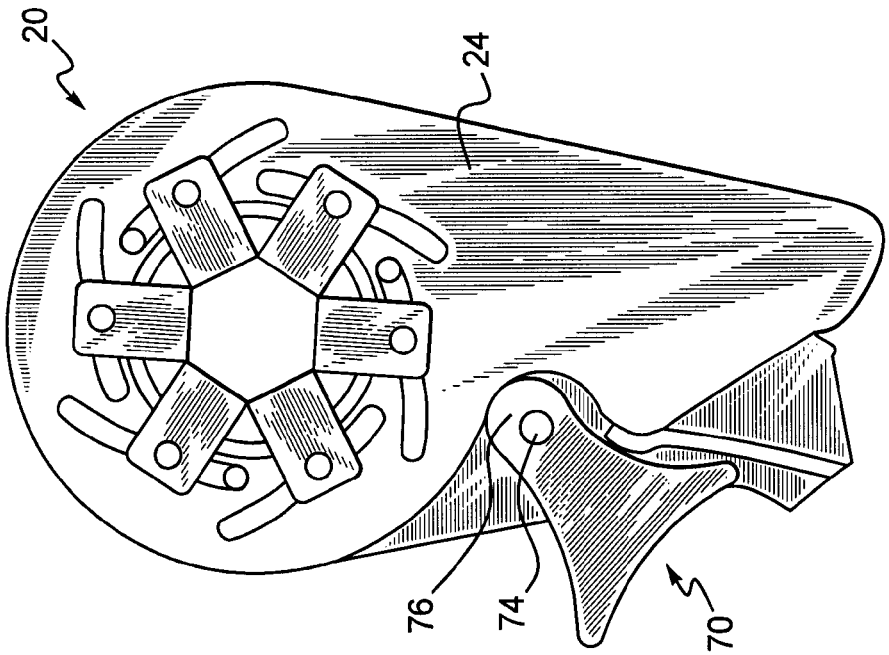
FIG. 7 is a detailed broken-away section view of the adjustable gripping tool of FIG. 6 wherein the lock mechanism is disposed in a locked or second operative position.

FIG. 7 illustrates the adjustable gripping tool 20 of FIG. 6 wherein the lock mechanism 70 has been moved from the first operative position (shown in FIG. 6) to a second operative position. As a result of movement of the lock mechanism 70 the clearance is eliminated between the operative or inner end 76 and the second element 24. Accordingly, the lock mechanism 70 binds against the second element 24 such that the first element and second element 24 cannot be moved relative to one another without first releasing the lock mechanism 70. It will be recognized by those of skill in the art that the pin 74 used to mount the lock mechanism 70 to the first element 22 is most often offset from the longitudinal axis of the lock mechanism 70. However, an eccentric surface at the inner or operative end 76 may also be formed to enable the same function.

Figure 8:
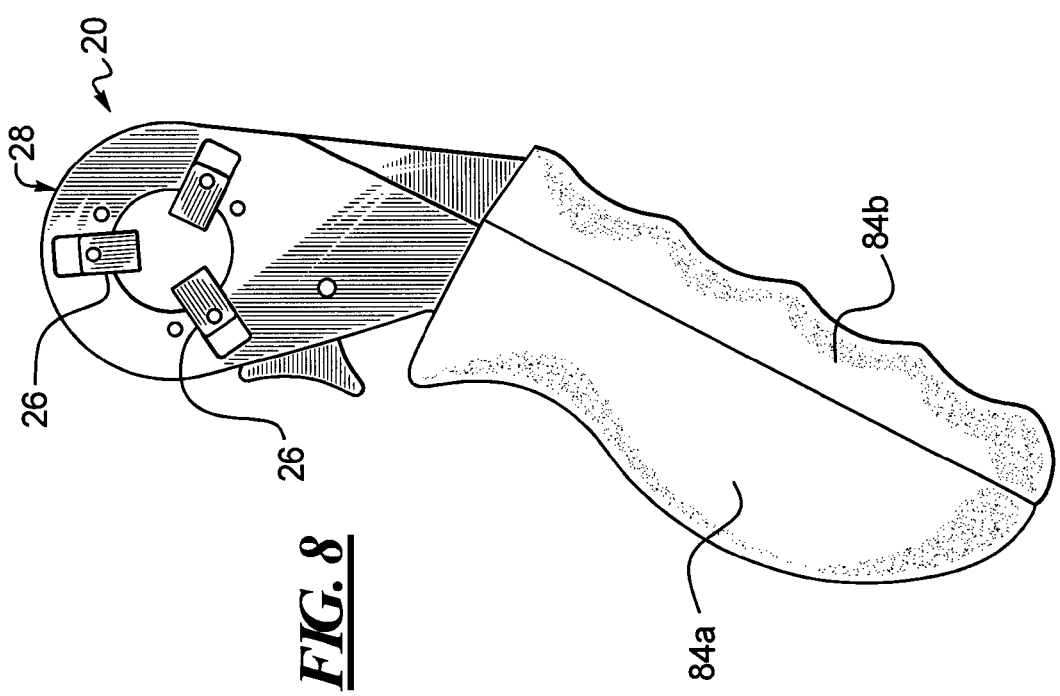
FIG. 8 is a top plan view of another embodiment of an adjustable gripping tool in accordance with the principles of the present disclosure.

FIG. 8 illustrates another embodiment of the present disclosure of the adjustable gripping tool 20 wherein only three gripping elements 26 are shown. It is within the teaching of the present disclosure that the gripping portion 28 only include at least one gripping element 26. Grips 84A, 84B may also be provided for the first element 22 and second element 24 to further facilitate effective ergonomic actuation of the adjustable gripping tool 20. The remaining structural and functional elements and aspects of this embodiment of the present disclosure may be configured as any of the like structure and functional aspects of the other embodiments disclosed herein.

Figure 9:
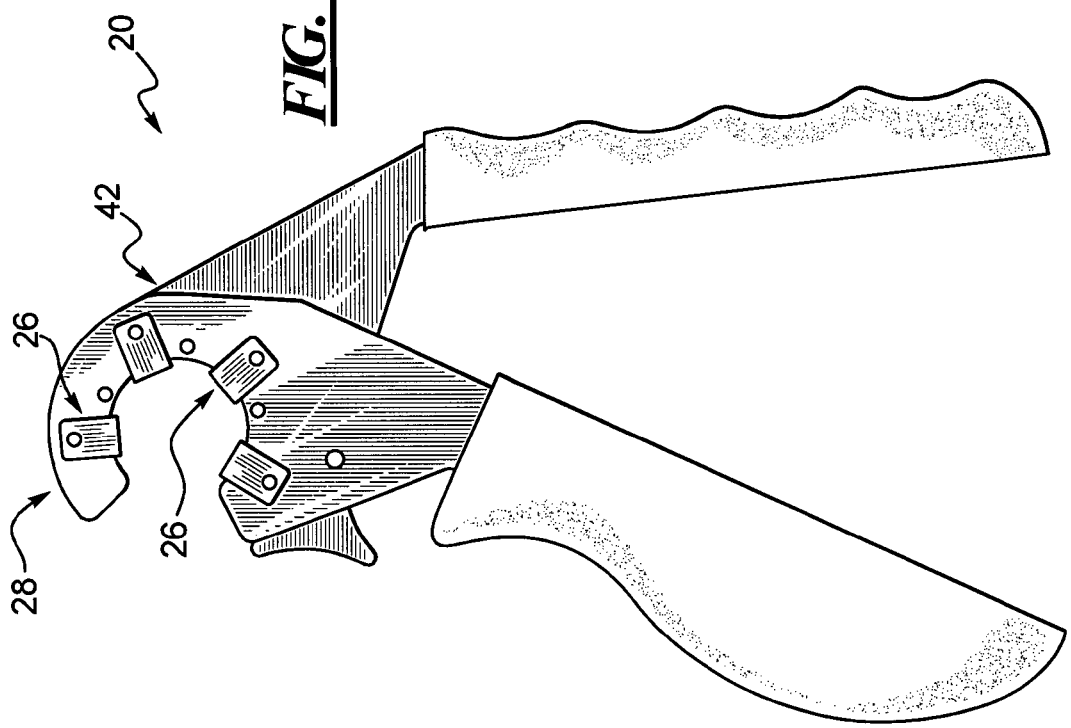
FIG. 9 is a top plan view of yet another embodiment of an adjustable gripping tool in accordance with the principles of the present disclosure.

FIG. 9 illustrates yet another embodiment of the present disclosure directed to an adjustable gripping tool 20. In this embodiment of the present disclosure, the gripping portion 28 and the actuation portion 42 are configured penannular. Such configuration enables the wrench 20 to engage the work piece laterally or in a radial direction. Further, four gripping elements 26 are illustrated in this embodiment. The remaining structural and functional elements and aspects of this embodiment of the present disclosure may be configured as any of the like structure and functional aspects of the other embodiments disclosed herein.

FIG. 10 illustrates another embodiment of the present disclosure wherein the adjustable gripping tool 20 is configured as a cutting or scoring device for engaging, for example, a tubular element. In this embodiment, the second element 24 is configured substantially U-shaped. Such configuration may be achieved by binding, folding or otherwise forming a unitary element as shown in FIG. 10. The remaining structural and functional elements and aspects of this embodiment of the present disclosure may be configured as any of the like structure and functional aspects of the other embodiments disclosed herein.

The first and second elements 22, 24 are connected for relative movement in order to generate linear movement of the gripping elements. It is within the teachings of the present disclosure that the gripping elements may also be configured to score or cut a work piece. For example, in one embodiment, the gripping elements described above which are configured to engage the work piece as described above may be replaced with gripping elements configured to perform the scoring or cutting functions.

FIG. 11 illustrates a top plan view of the embodiment of the present disclosure in FIG. 10 disposed in a closed position. The first and second elements 22, 24 have been moved toward one another such that the gripping elements 26 extend into the first opening 30 to engage a work piece (not shown). As shown in FIG. 10, this embodiment is configured to engage a tubular element, such as a pipe or other suitable work piece. For example, a polyvinyl chloride ("PVC") pipe may be cut or scored with the sharp-edged gripping elements of this embodiment and not distort the PVC pipe. As a result, in addition to a clean perpendicular cut-off, the PVC pipe is not deformed so that further coupling is problematic. The remaining structural and functional elements and aspects of this embodiment of the present disclosure may be configured as any of the like structure and functional aspects of the other embodiments disclosed herein.

FIG. 12 illustrates a sectional view of the adjustable gripping tool 20 of FIG. 10 taken through the first element 22, where the tool 20 is disposed in an open position. The gripping element 26 disposed within the guides 32 include all the structural elements as described above. However, rather than a U-shaped body, a force transfer element extends from each side of the body portion to engage the slots of the pair of elements 25a, 25b (25b in FIG. 11) which comprise the second element 24.

Figure 13:
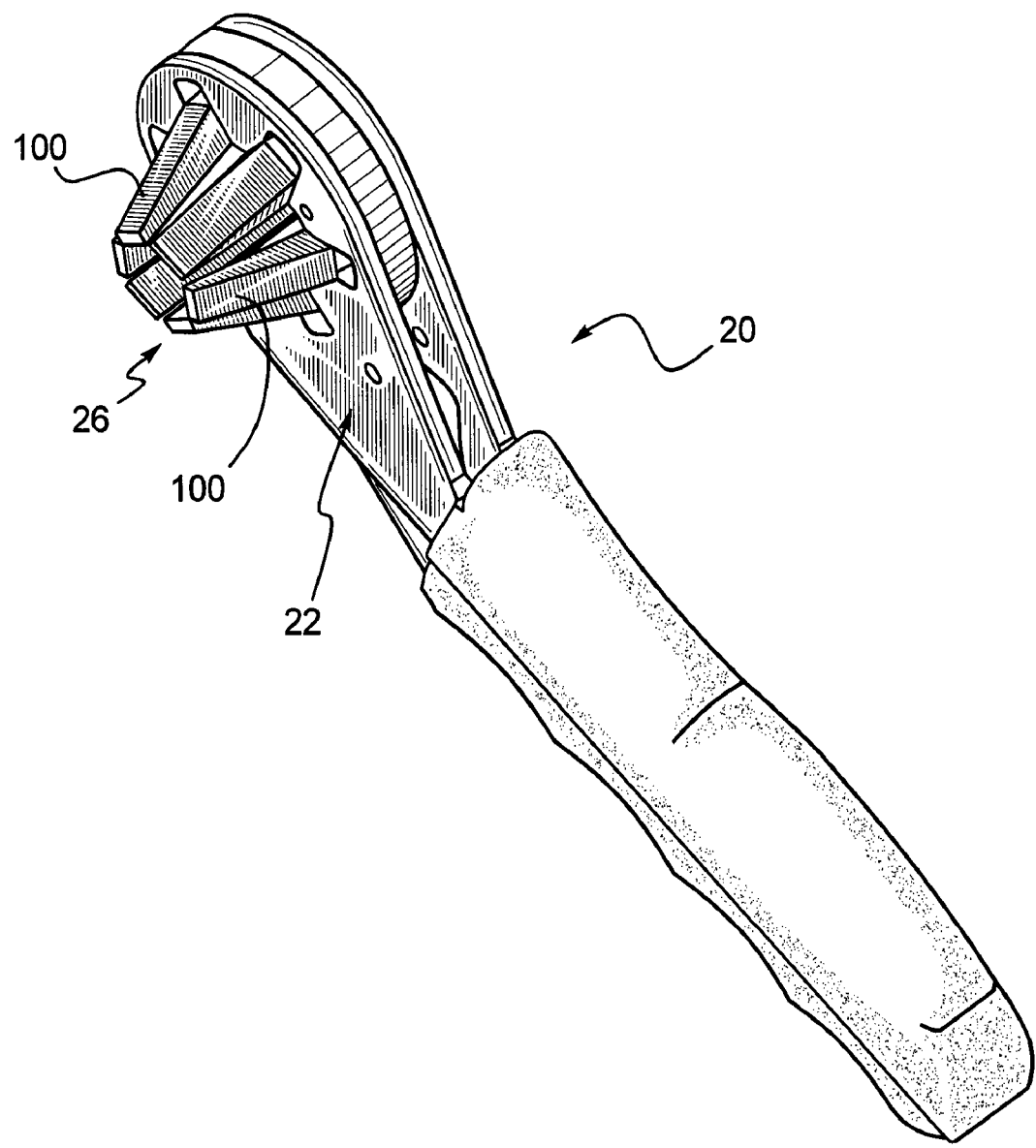
FIG. 13 is a perspective view of another embodiment of an adjustable gripping tool in accordance with the principal aspects of the present disclosure.

FIG. 13 illustrates a perspective view of another embodiment of an adjustable gripping tool in accordance with the principal aspects of the present disclosure. In this embodiment of the present disclosure, the adjustable gripping tool 20 includes gripping elements 26 which have extensions 100 that extend beyond the first element 22. The extensions 100 facilitate engaging work pieces disposed in a space-limited location, where access for the entire tool 20 may be difficult or problematic. The remaining structural and functional elements and aspects of this embodiment of the present disclosure remain the same as detailed above. Alternatively, other structural elements may be formed on the extensions 100 to enable additional functions for the tool 20, such as crimping, cutting, or any other suitable function. Additionally, the extensions 100 may extend to either side or both and incorporate any of the embodiments set for the below or herein to facilitate any intended function. The remaining structural and functional elements and aspects of this embodiment of the present disclosure may be configured as any of the like structure and functional aspects of the other embodiments disclosed herein.

Figure 15:
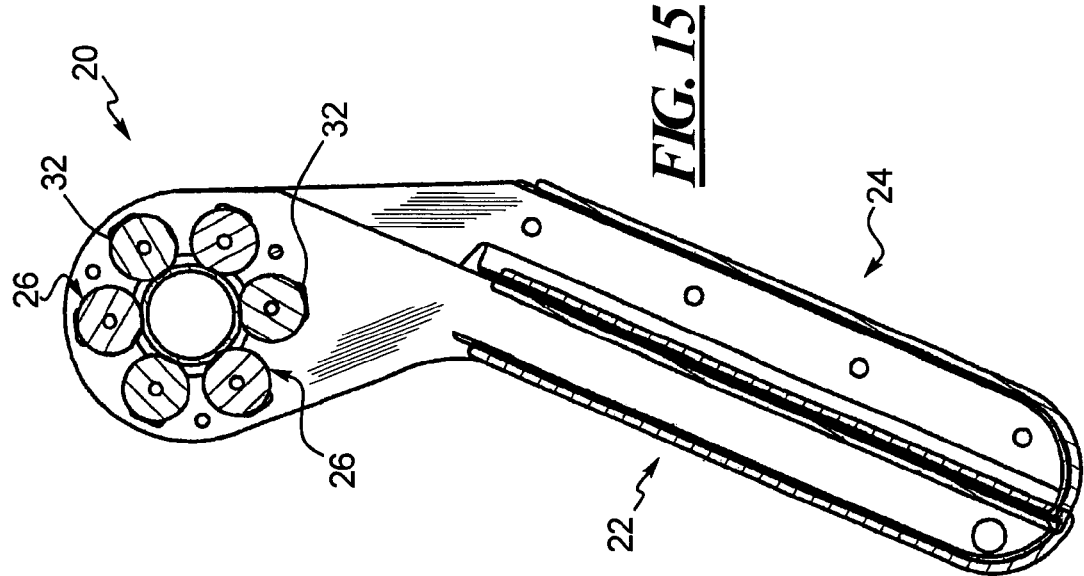
FIG. 15 is a sectional view of the adjustable gripping tool of FIG. 14 taken along a line passing between a first element and a second element.
Figure 14:
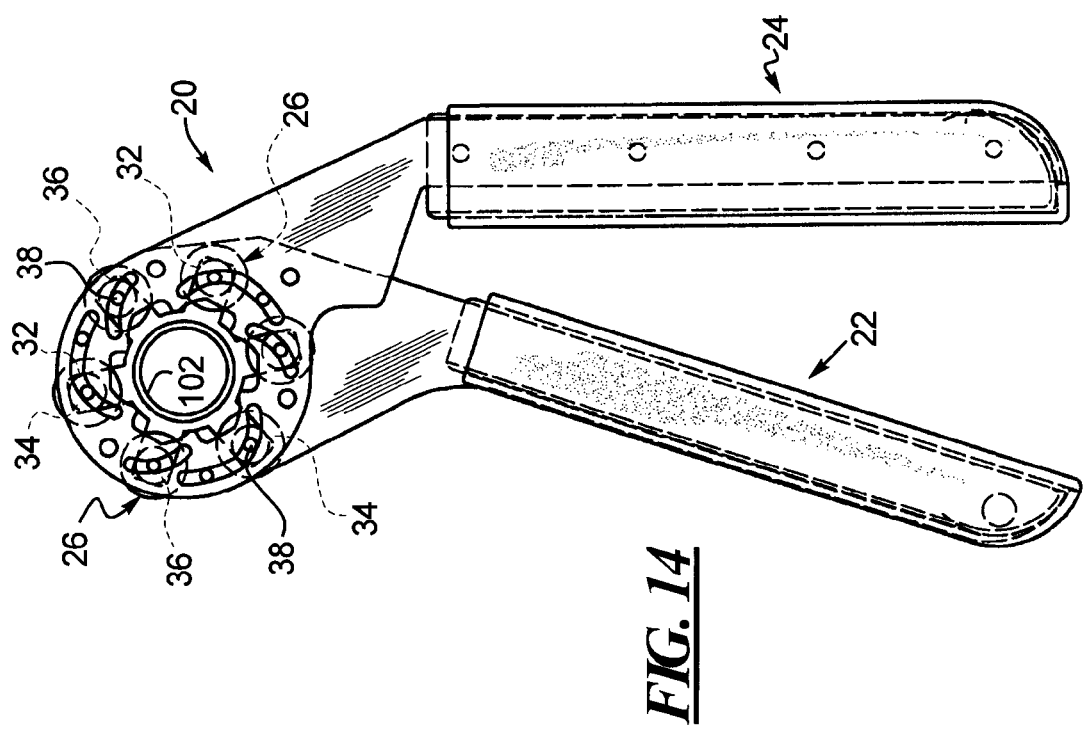
FIG. 14 is a top plan view of another embodiment of an adjustable gripping tool in accordance with the principal aspects of the present disclosure.

FIG. 14 illustrates a top plan view of another embodiment of an adjustable gripping tool 20 in accordance with the principal aspects of the present disclosure. In this embodiment, the adjustable gripping tool 20 includes gripping elements 26 which are each configured as a cutting wheel that movably engages the work piece 102 to facilitate severing of the work piece 102 by movement of the tool 20 about the work piece 102 after movement of the second element 24 with respect to the first element 22, as shown in FIG. 15. As with the other gripping elements described herein, the cutting wheels 26 include a body portion 34 adapted for engaging work piece 102, an arm portion 36 configured to engage one of the guides 32 and a force transfer element 38 contiguous with or preferably connected to the arm portion 36. As shown in FIG. 15, relative movement of the second element 24 with respect to the first element 22 actuates each gripping element or cutting wheel 26 along a respective guide 32 in order to facilitate engagement with the work piece 102. It is within the teachings of the present disclosure that the gripping elements or cutting wheels 26, in this embodiment or any other herein, may be configured in any suitable manner or structure in order to achieve any identified or desired purpose and that only at least one gripping element or cutting wheel 26 is necessary and the number of gripping elements or cutting wheels 26 is not limited. Furthermore, the adjustable gripping tool 20 may be configured such that the cutting wheels 26 may be replaceable in the event they dull or break. The remaining structural and functional elements and aspects of this embodiment of the present disclosure may be configured as any of the like structure and functional aspects of the other embodiments disclosed herein.

FIGS. 16 and 17 are perspective views of another embodiment of an adjustable gripping tool 20 in accordance with the principal aspects of the present disclosure. In this embodiment, the adjustable gripping tool 20 includes extensions 100 that project from the gripping elements 26 to engage an interior of a work piece (not shown for clarity). The extensions 100 shown in this embodiment are substantially L-shaped and define a pocket 106 between the extension 100 and the gripping element 26 to receive the work piece. When configured as such, the extension 100 of this embodiment, is facilitates a crimping operation. Another feature of this embodiment, is a reverse or divergent operation of the gripping elements 26 upon relative movement of the first element 22 with respect to the second element 24. Such a configuration enables the gripping elements 26 to engage a first dimension work piece with the first and second elements 22, 24 disposed in a first operative position (as shown in FIG. 16) and a second dimension work piece with the first and second elements 22, 24 disposed in the second operative position (as shown in FIG. 17), such that the first dimension work piece is smaller than the second dimension work piece (both of which are not shown for clarity). It is within the teachings of the present invention that the adjustable gripping tool 20 as shown in FIG. 16 may be used to engage a single work piece and upon relative movement of the first and second elements 22, 24 impart a crimping operation upon such work piece and complete such operation upon attaining the configuration as shown in FIG. 17. It is within the teachings of this disclosure that the extensions 100 may take any other suitable configuration or structure, one such example may be the tap shown in FIG. 25 or a structure wherein the extensions project to both sides of the adjustable gripping tool. and function in the same manner to achieve any desired purpose. The remaining structural and functional elements and aspects of this embodiment of the present disclosure may be configured as any of the like structure and functional aspects of the other embodiments disclosed herein.

FIG. 18 is an exploded view and FIG. 19 is a top plan view, both of another embodiment of an adjustable gripping tool 20 in accordance with the principal aspects of the present disclosure. In this embodiment, the adjustable gripping tool 20 includes gripping elements 26 which have a planar configuration. The gripping elements 26 have a thickness 108 that is generally equivalent to a thickness 110 of the respective first element 22 with which such gripping element 26 is associated. Such a configuration of the gripping elements 26 in this embodiment facilitates flexibility of such gripping elements in operation of the gripping tool 20 to engage the work piece. Moreover, gripping elements 26 having a planer configuration are more simple to manufacture various shapes and lengths and to assemble within the adjustable gripping tool 20.

Another aspect of this embodiment of the present disclosure is that the gripping elements 26 are configured to have a V-shape 112 in the body portion of the gripping element such that the vertex 114 of the V-shape 112 is directed towards the force transfer element 38. Such configuration facilitates face-loading and corner loading for hex-shaped work pieces or those work pieces with defined corners, as described in more detail above and point loading for those work pieces that are generally cylindrical, tubular or have corners with angles between adjacent sides thereof that are larger than the angle of the sides of the V-shape. The remaining structural and functional elements and aspects of this embodiment of the present disclosure may be configured as any of the like structure and functional aspects of the other embodiments disclosed herein.

Figure 20:
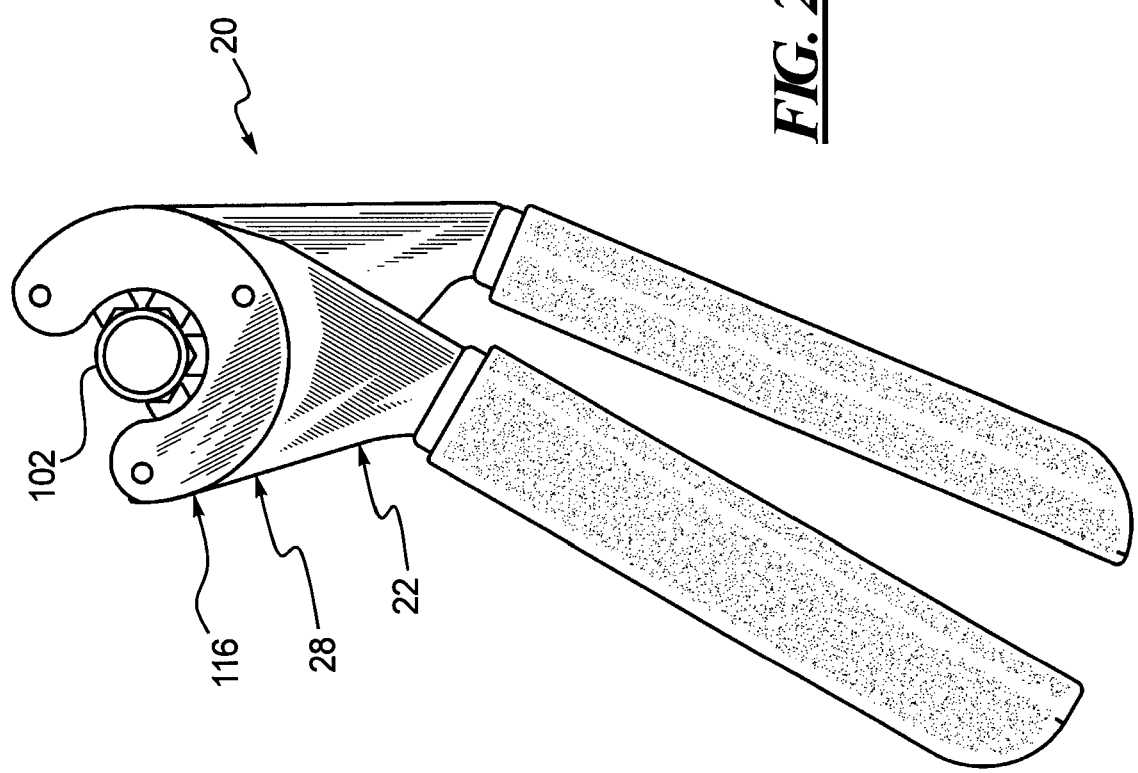
FIG. 20 is a top plan view of another embodiment of an adjustable gripping tool in accordance with the principal aspects of the present disclosure.
Figure 21:
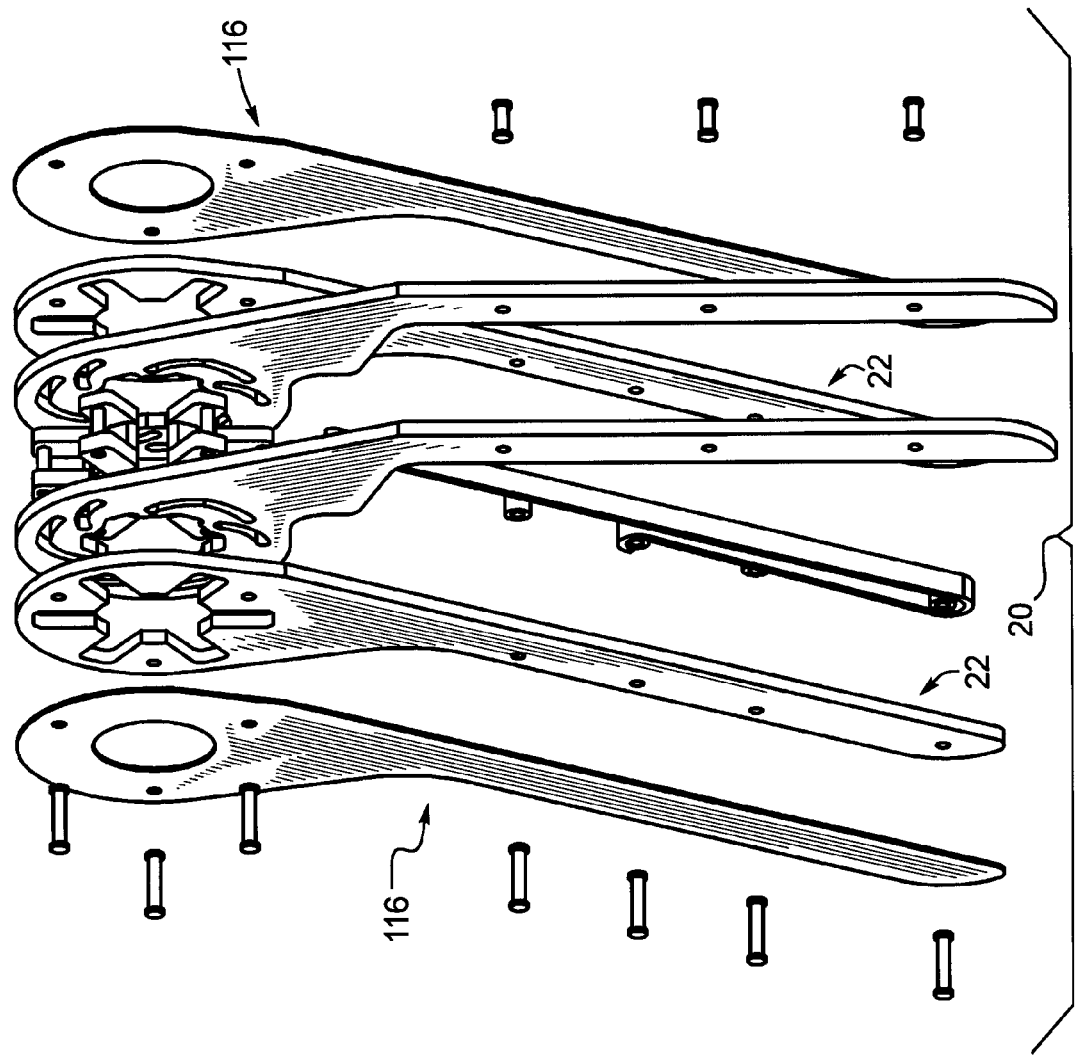
FIG. 21 is an exploded view of another embodiment of an adjustable gripping tool in accordance with the principal aspects of the present disclosure.
Figure 22:
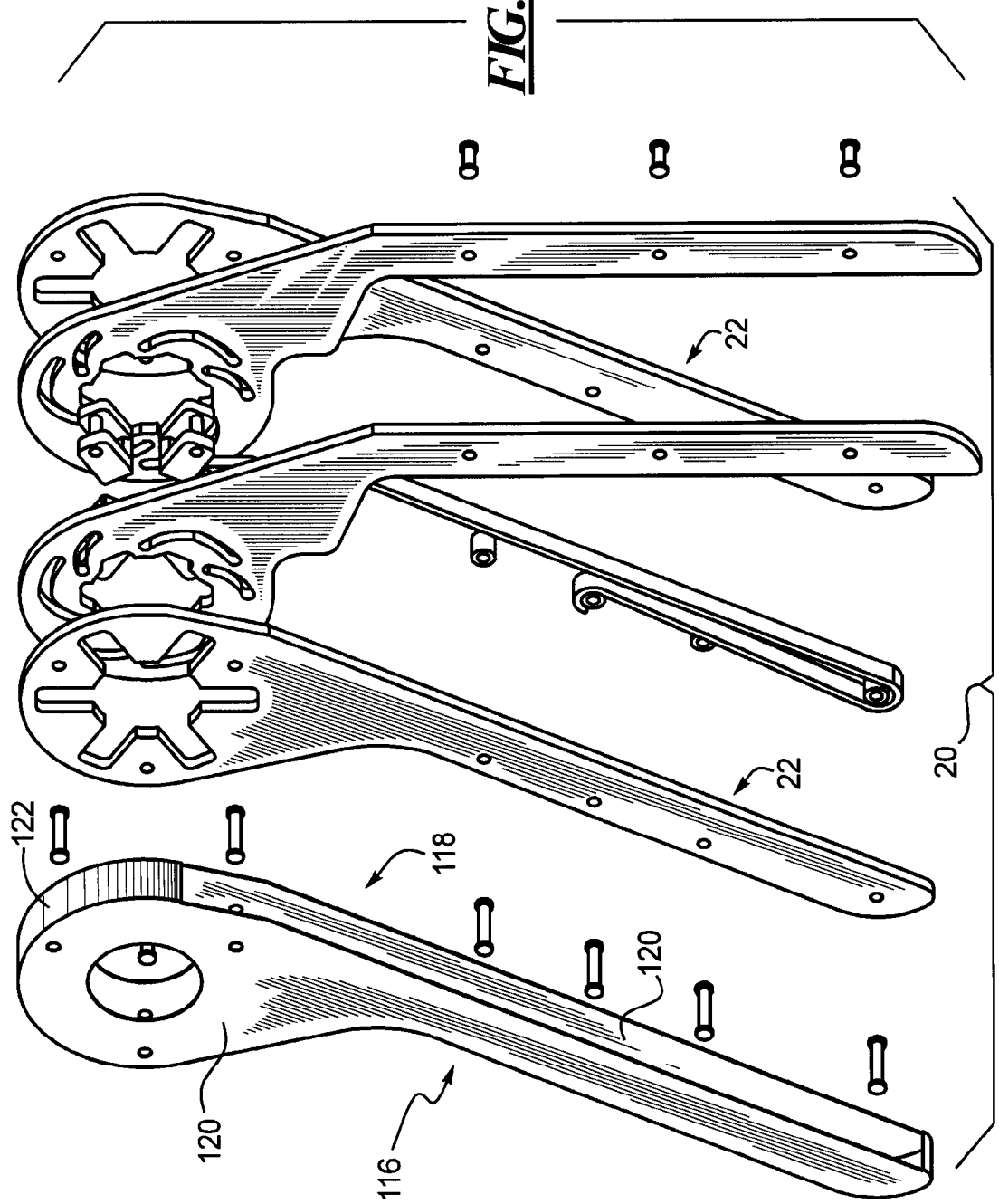
FIG. 22 is an exploded view of another embodiment of an adjustable gripping tool in accordance with the principal aspects of the present disclosure.

FIG. 20 is a top plan view and FIGS. 21 and 22 are exploded views, all of other embodiments of an adjustable gripping tool 20 in accordance with principal aspects of the present disclosure. Each of the embodiments shown in these figures has a common element, a cover plate 116, connected in any conventional manner to the first element 22 to reinforce and protect the adjustable gripping tool 20. As shown in FIG. 20, the cover plate 116 has a penannular configuration and is attached to the gripping portion 28 of the first element 22. It will be recognized by those skill in art that the cover plate 116 of such configuration facilitates reinforcement of the adjustable gripping tool 20 having a open head or penannular configuration that facilitates radial engagement of a work piece 102. This embodiment also shows the V-shaped gripping elements of an above-described embodiment for face- or corner-loading the work piece 102. The remaining structural and functional elements and aspects of this embodiment of the present disclosure may be configured as any of the like structure and functional aspects of the other embodiments disclosed herein.

As shown in FIG. 21, this embodiment of the present disclosure includes a cover plate 116 that has an overall dimension and shape that is generally equivalent to an overall dimension and shape of the first element 22 and is attached over each first element 22. It will be recognized by those of skill of the art that substantial reinforcement of the entire length of the tool 20, i.e. gripping and grasping portions, is provided in this embodiment of the present disclosure and that such configuration also provides protection to the operating elements of the adjustable gripping tool. The remaining structural and functional elements and aspects of this embodiment of the present disclosure may be configured as any of the like structure and functional aspects of the other embodiments disclosed herein.

As shown in FIG. 22, the cover plate 116 is configured as a receptacle 118 defined by a pair of cover portions 120 offset by a margin portion 122 to engage outer surfaces of a pair of aligned first elements 22. In addition to the reinforcing and protection advantages discussed above, this embodiment of the present disclosure further provides an additional level of isolation and protection of the gripping and grasping portions and in particular, the gripping elements, from the effects of an operating environment that may be dusty, dirty or subject to harsh fluids. The remaining structural and functional elements and aspects of this embodiment of the present disclosure may be configured as any of the like structure and functional aspects of the other embodiments disclosed herein.

Figure 23:
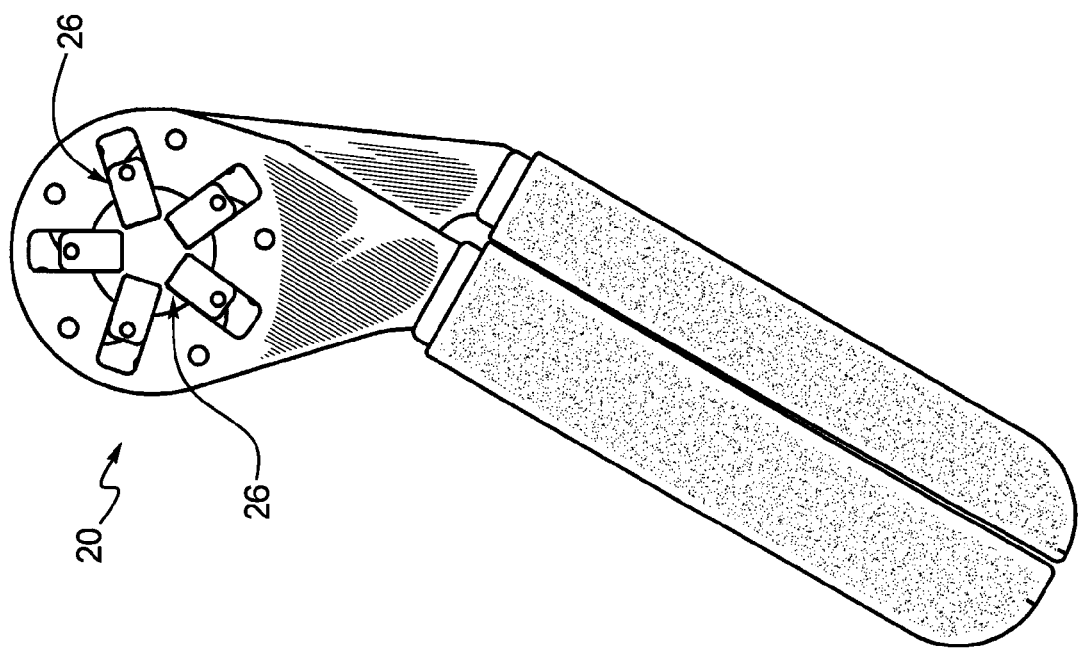
FIG. 23 is a top plan view of another embodiment of an adjustable gripping tool in accordance with the principal aspects of the present disclosure.

FIG. 23 is a top plan view of another embodiment of an adjustable gripping tool 20 is accordance with the principle aspects of the present disclosure. In this embodiment, the adjustable gripping tool 20 includes the gripping elements 26 configured to engage a non-standard work piece. As used in this disclosure, a non-standard work piece may be a security fastener, or any other type or kind of work piece that does not have a conventional cylindrical, tubular, hex, square or other standard dimension or shape. As discussed many times above, the adjustable gripping tool 20 may have the gripping elements 26 configured in any suitable manner to engage any desired work piece. The remaining structural and functional elements and aspects of this embodiment of the present disclosure may be configured as any of the like structure and functional aspects of the other embodiments disclosed herein.

Figure 25:
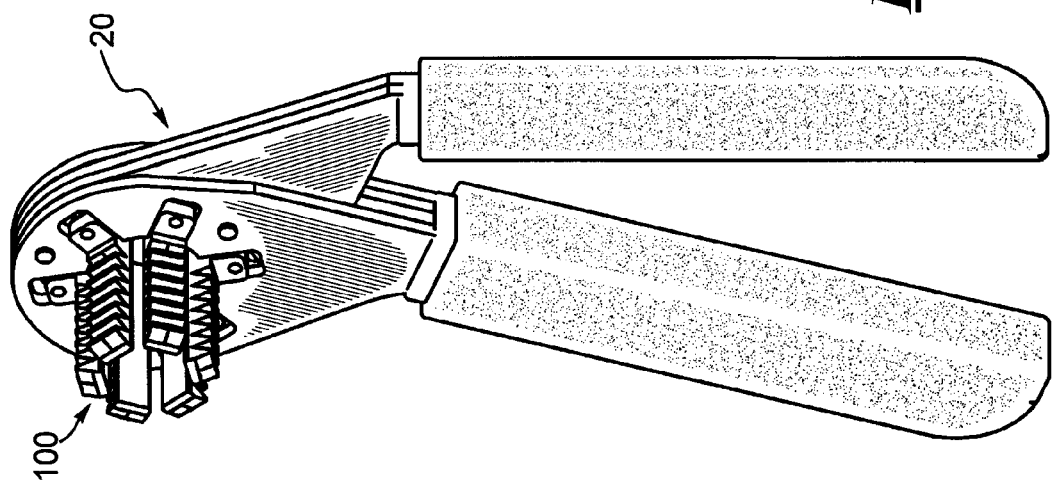
FIG. 25 is a perspective view of another embodiment of an adjustable gripping tool in accordance with the principal aspects of the present disclosure.
Figure 24:
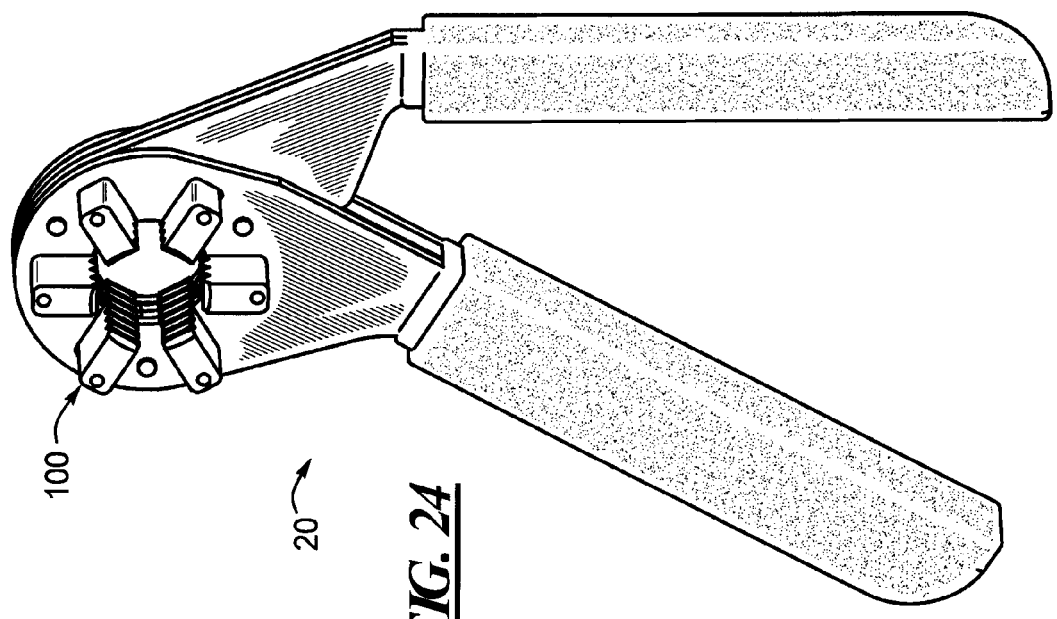
FIG. 24 is a perspective view of another embodiment of an adjustable gripping tool in accordance with the principal aspects of the present disclosure.

FIGS. 24 and 25 are perspective views of other embodiments of an adjustable gripping tool 20 in accordance with the principle aspects of the present disclosure. In these embodiments, the gripping elements 26 include extensions 100 which are configured to cooperatively function to facilitate chasing threads. It will be recognized by those of skill in the art that the gripping elements 26 and extensions 100 may be configured to engage any desired type of thread, for example, pipe threads, standard coarse or fine threads, metric coarse or fine threads or any other conventional or proprietary type of thread configuration. The embodiment shown in FIG. 24 is configured to engage exterior threads formed on a work piece, while the embodiment disclosed in FIG. 25 is configured to engage the interior threads formed on a work piece, both in a manner described above. These embodiments are particularly advantageous over prior art thread chasing devices in that the present embodiments may chase all the threads of the work piece rather than starting at one end of the work piece and proceeding axially which may be difficult or problematic in the event that the initial starting threads are so damaged that the thread chasing device cannot properly engage the work piece threads. The present embodiment overcomes such disadvantage by engaging a substantial portion of the threads of the work piece past an initial engagement point for the threads, as would a conventional thread chaser. The remaining structural and functional elements and aspects of this embodiment of the present disclosure may be configured as any of the like structure and functional aspects of the other embodiments disclosed herein.

Figure 26:
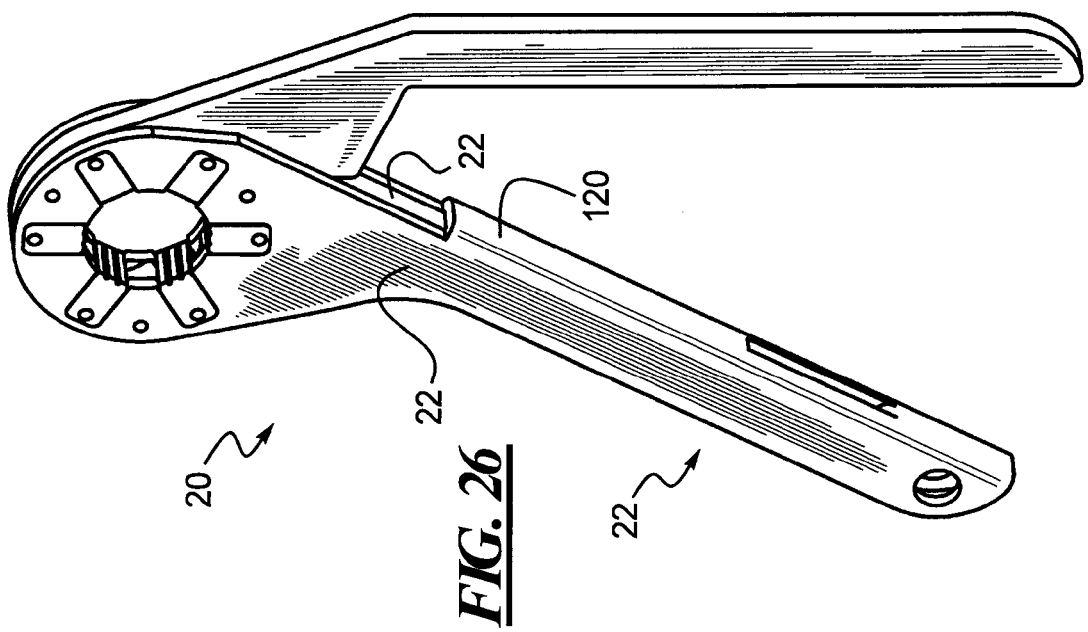
FIG. 26 is a perspective view of another embodiment of an adjustable gripping tool in accordance with the principal aspects of the present disclosure.

FIG. 26 is a perspective view of another embodiment of an adjustable gripping tool 20 in accordance with the principle aspects of the present disclosure. In this embodiment, the first element 22 includes a pair of first elements 22 and a backbone 120 connecting a portion of common edges of the pair of first elements 22. The pair of first elements 22 and the backbone 20 are integrally formed from a unitary blank of material. This embodiment is advantageous in that manufacture of the first element is efficient, economical and has increased strength. The remaining structural and functional elements and aspects of this embodiment of the present disclosure may be configured as any of the like structure and functional aspects of the other embodiments disclosed herein.

Figure 27:
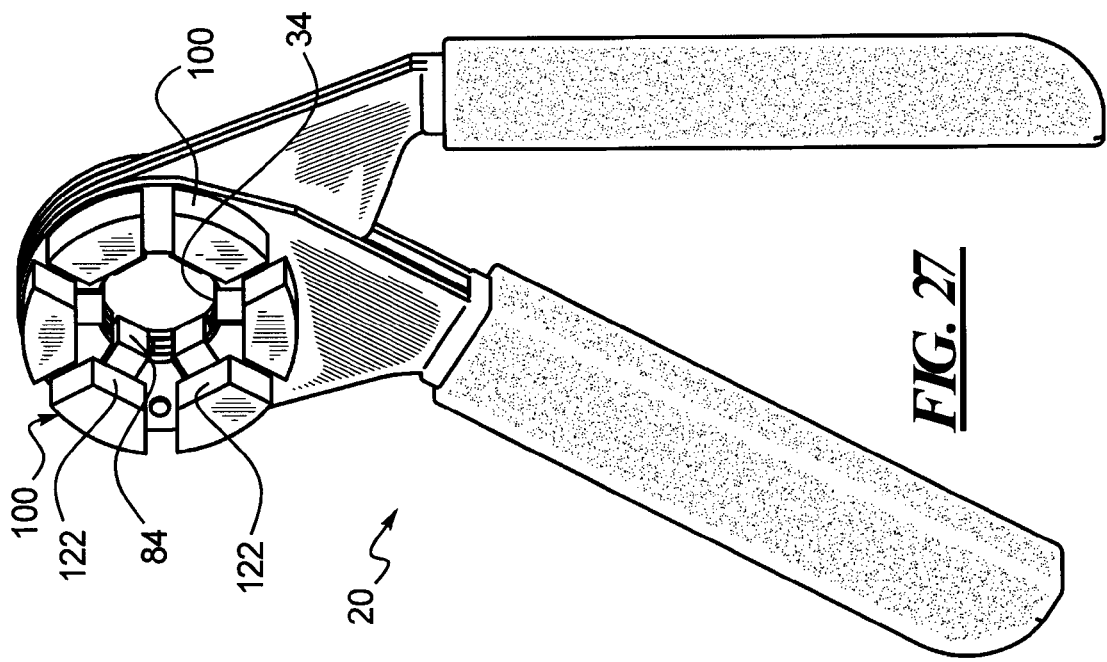
FIG. 27 is a perspective view of another embodiment of an adjustable gripping tool in accordance with the principal aspects of the present disclosure.
Figure 28:
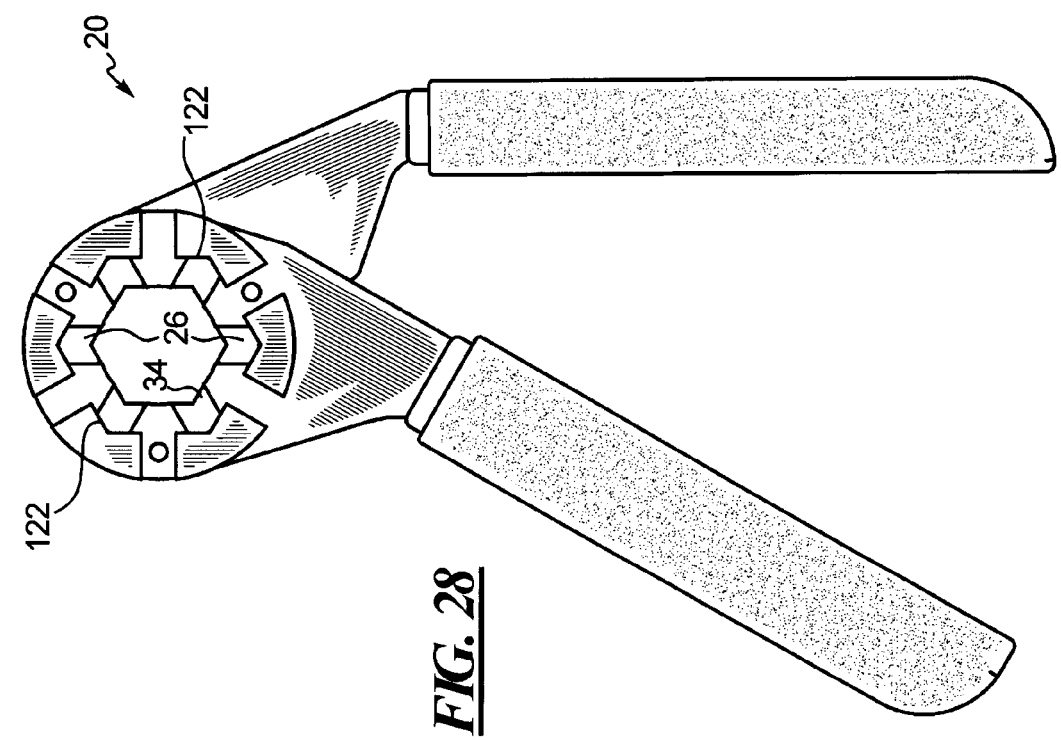
FIG. 28 is a perspective view of another embodiment of an adjustable gripping tool in accordance with the principal aspects of the present disclosure.

FIGS. 27 and 28 are perspective and top plan views other embodiments of an adjustable gripping tool 20 in accordance with the principle aspects of the present disclosure. In these embodiments, each gripping element 26 includes an extension 100 that projects from the gripping element 26 to define a second body portion 122 adapted for engaging the work piece such that the body portion 34 facilitates a first range of gripping ability and the second body portion 122 facilitates a second range of gripping ability. It will be recognized those of skill in the art that the adjustable gripping tool 20 of these embodiments facilitates a wide range of gripping ability such that a single adjustable gripping tool 20 may replace a considerable number of similar tools. The remaining structural and functional elements and aspects of this embodiment of the present disclosure may be configured as any of the like structure and functional aspects of the other embodiments disclosed herein.

Figure 29:
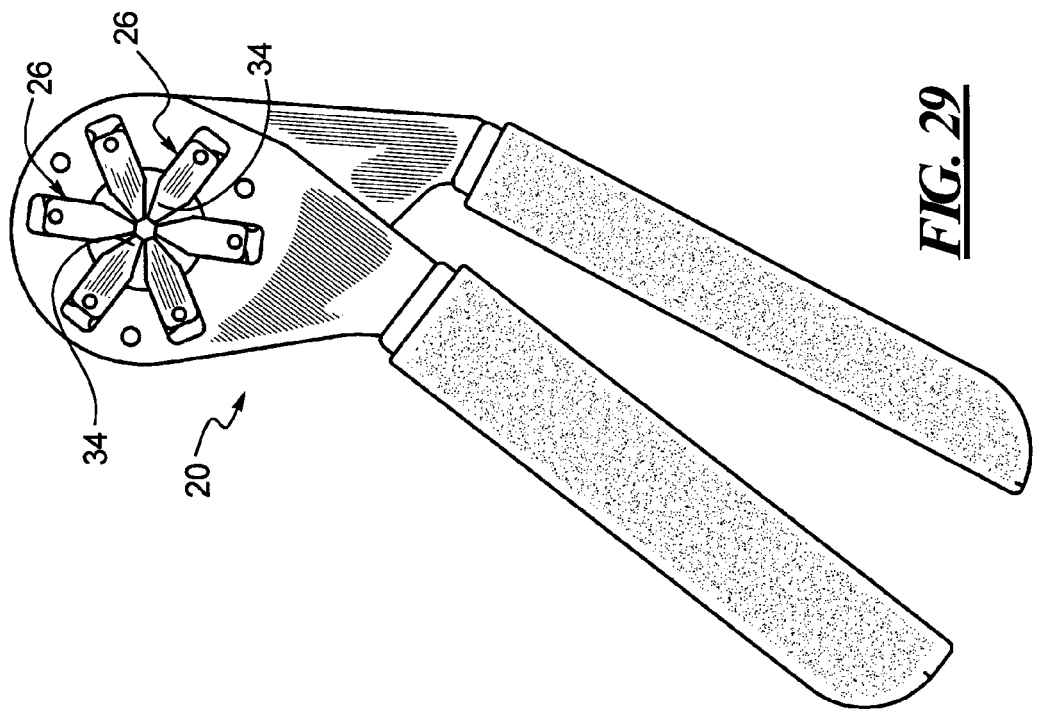
FIG. 29 is a perspective view of another embodiment of an adjustable gripping tool in accordance with the principal aspects of the present disclosure.

FIG. 29 is a top plan view of another embodiment of an adjustable gripping tool 20 in accordance with the principle aspects of the present disclosure. In this embodiment, the adjustable gripping tool 20 includes gripping elements 26 that have been configured such that the body portion 34 of each gripping element 26 facilitates crimping a wire/terminal connection or a rather suitable or like connection. The remaining structural and functional elements and aspects of this embodiment of the present disclosure may be configured as any of the like structure and functional aspects of the other embodiments disclosed herein.

FIG. 30 is a top plan view, FIG. 31 is a side elevation view and FIG. 32 is a bottom plan view, all of another embodiment of an adjustable gripping tool 20 in accordance with the principle aspects of the present disclosure. In this embodiment, the adjustable gripping tool 20 primarily includes a first element 22 and a second element 24 connected for a relative movement. The first element includes a first grasping portion 21 and the second element includes a second grasping portion 25. The first and second grasping portions 21, 25 are formed substantially as and commonly referred to as a handle of a tool. The relative movement between the first element 22 and the second element 24 generates, in one embodiment, generally linear movement of the gripping elements 26.

The first element 22 further includes a gripping portion 28, formed substantially as and commonly referred to as a head of a tool, disposed at one end of the first grasping portion 21, and configured to engage the work piece (not shown for clarity) including a plurality of guides 32 formed in the grasping portion 28 and the gripping elements 26. The gripping elements 26 each include a body portion 34, adapted for engaging the work piece, an arm portion 36, configured to engage one of the guides 32 and a force transfer element 38 contiguous with or preferably connected to the arm portion 36. In this embodiment, the guides 32 are formed as grooves in the gripping portion 28 that do not pass completely through the gripping portion, as best shown in FIG. 32. It is within the teachings of the present disclosure that the guides 32 may be formed as slots, grooves, channels or any other suitable configuration. As discussed in the many embodiments above, it is within the teachings of the present disclosure that the gripping elements may be formed in any suitable manner or configuration.

The second element 24 further includes an actuation portion 42, formed substantially as and commonly referred to as a head of a tool, disposed at one end of the second grasping portion 25 having an opening 44 and a plurality of slots 46 disposed adjacent the opening 44. In one embodiment, each of the slots 46 has a first section 48 configured to engage one of the force transfer elements or pins 38 such that movement of the second element 24 with respect to the first element 22 simultaneously actuates the first sections 48 to contact the force transfer elements 38 along a path defined by the first section thereby actuating the gripping elements 26 along the guides 32. It will be recognized by those of skill in the art that the first sections 48 define a path which generally decreases in terms of radial measurement from a center of the opening 44 from an outer end to an inner end. In another embodiment, the paths may generally increase in terms of radial measurement from the center of the opening 44, such that relative movement between first and second elements generates an outward motion of the gripping elements originally disposed adjacent the center of the opening 44. Alternatively, the guides, slots and force transfer elements may be configured to interact in a number of different ways to move the actuation elements into movement with a gripping or work piece engaging elements.

In this embodiment, the body portions 34 include an extension 100 to facilitate increased area of the body portion for gripping the work piece. In one embodiment, the first element 22 may further include a plurality of aligning elements 58 for engaging the second sections 54. Each aligning element 58 is disposed between an adjacent pair of guides 32 and extends parallel to the force transfer element 38. In operation, each one of the aligning elements 58 engages one of the second sections 54 during relative movement between the first element and the second element the first and second elements 22, 24 remain generally aligned. The remaining structural and functional elements and aspects of this embodiment of the present disclosure may be configured as any of the like structure and functional aspects of the other embodiments disclosed herein.

Figure 33:
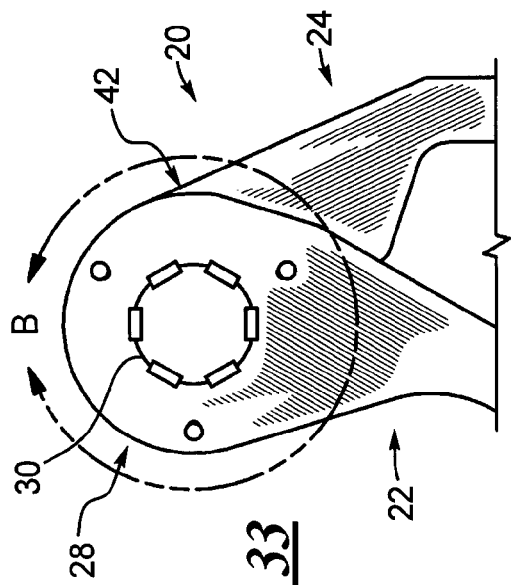
FIG. 33 is a partial top plan view of another embodiment of an adjustable gripping tool in accordance with the principal aspects of the present disclosure.
Figure 34:
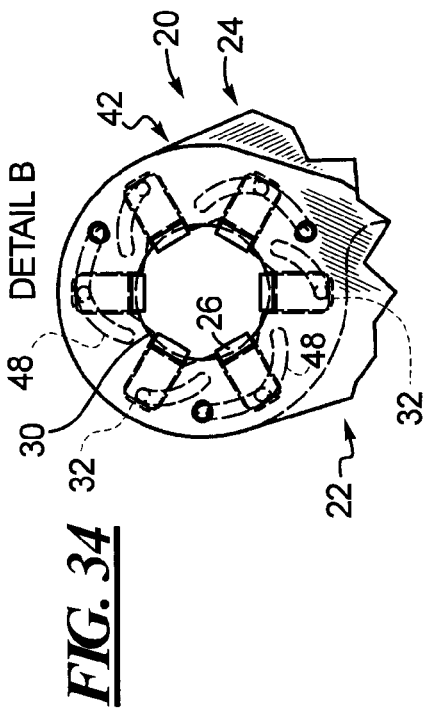
FIG. 34 is a detailed view of a portion of the adjustable gripping tool of FIG. 33 as defined by line B.
Figure 35:
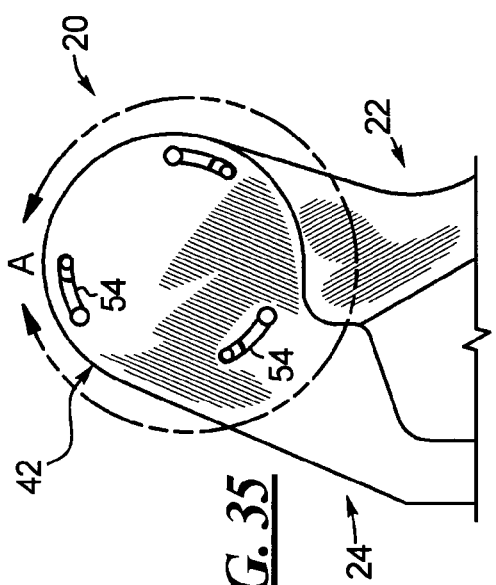
FIG. 35 is a partial bottom plan view of the adjustable gripping tool of FIG. 33.
Figure 36:
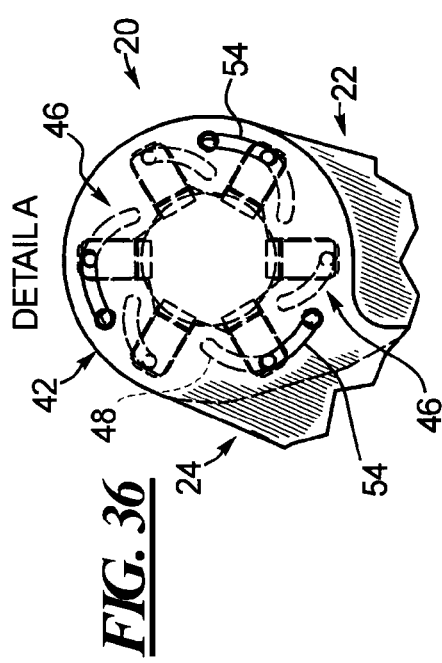
FIG. 36 is a detailed view of a portion of the adjustable gripping tool of FIG. 35 as defined by line A.

FIG. 33 is a partial top plan view of another embodiment of an adjustable gripping tool in accordance with the principle aspects of the present disclosure. FIG. 34 is a detailed view of a portion of the adjustable gripping tool 20 of FIG. 33 defined by line B. FIG. 35 is a partial bottom plan view of the adjustable gripping tool 20 of FIG. 33. FIG. 36 is a detailed view of a portion of the adjustable gripping tool 20 of FIG. 35 as defined by line A. In this embodiment, the adjustable gripping tool 20 primarily includes a first element 22 and a second element 24 connected for relative movement. The first element 22 includes a gripping portion 28 including a plurality of guides 32 (as best shown in FIG. 34) formed in the grasping portion 28 extending radially from a first opening 30 and the gripping elements 26.

The second element 24 includes an actuation portion 42 having a plurality of slots 46 formed therein. It is within the teachings of the present invention that the slots 46 may be formed as slots, grooves, channels, any combination thereof or any other suitable configuration. In this embodiment, the slots 46 have a first section 48 that is configured as a groove or channel, while the second sections 54 of the slots 46 are formed completely through the actuation portion 42 as would a conventional slot. The remaining structural and functional elements and aspects of this embodiment of the present disclosure may be configured as any of the like structure and functional aspects of the other embodiments disclosed herein.

Figure 37:
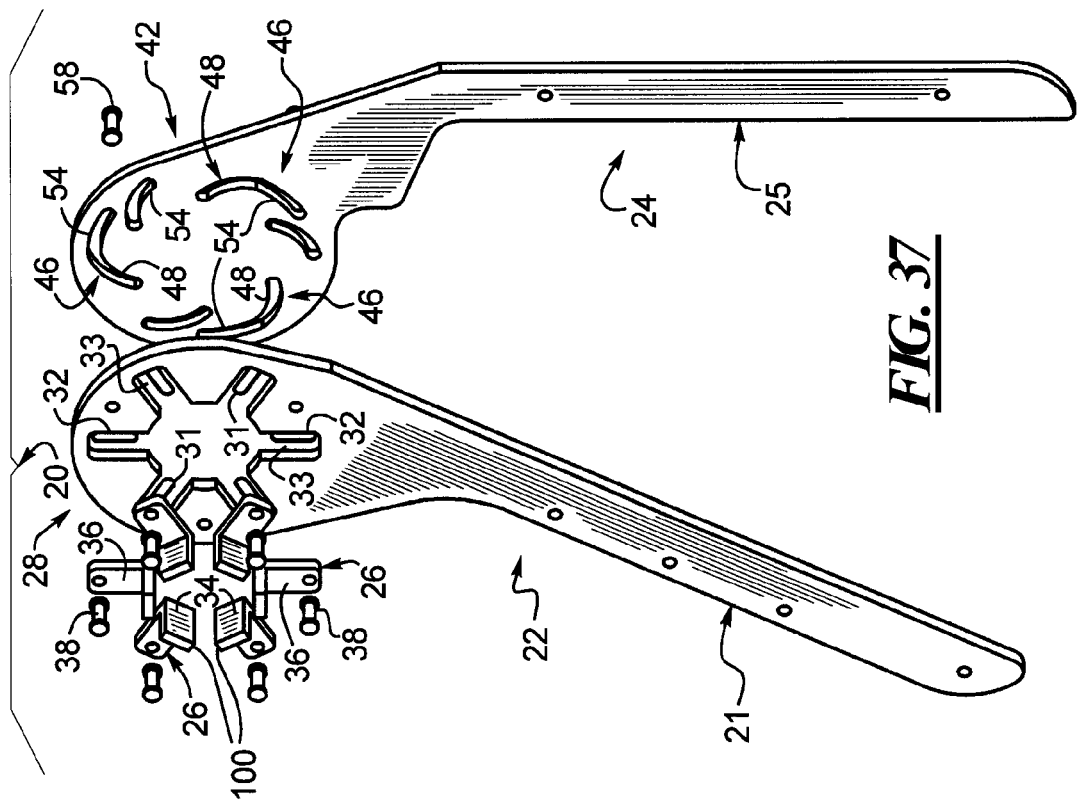
FIG. 37 is an exploded view of another embodiment of an adjustable gripping too in accordance with the principal aspects of the present invention.
Figure 38:
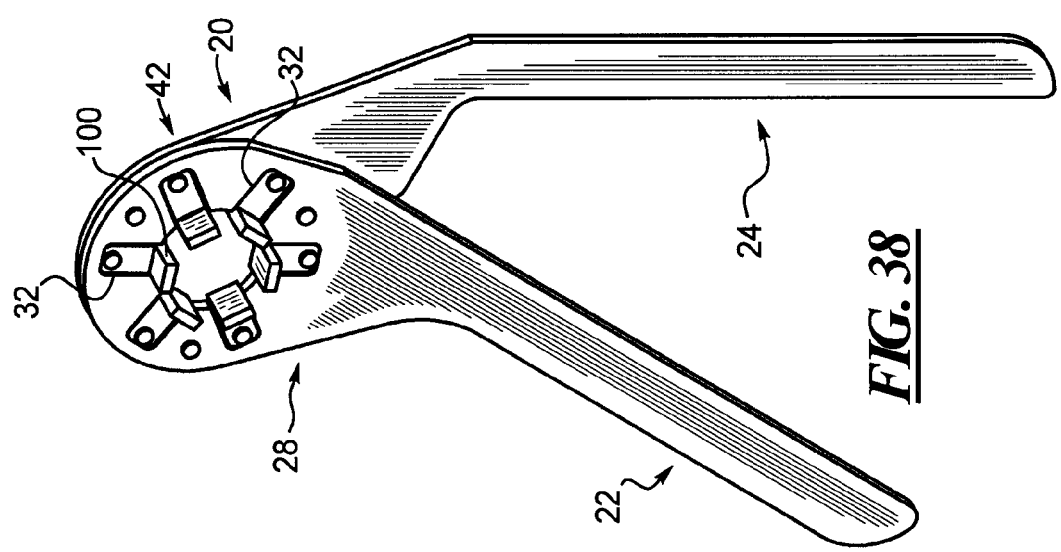
FIG. 38 is a perspective view of the adjustable gripping tool of FIG. 37.

FIG. 37 is an exploded view and FIG. 38 is a top plan view, both of another embodiment of an adjustable gripping tool 20 in accordance with the principle aspects of the present disclosure. In this embodiment, the adjustable gripping tool 20 primarily includes a first element 22 and a second element 24 connected for relative movement. The first element 22 further includes a gripping portion 28 formed substantially as and often referred to as a head of a tool, disposed at one end of the first grasping portion 21, and configured to engage the work piece (not shown for clarity) including a plurality of guides 32 formed in the grasping portion 28 and the gripping elements 26. The guides 32 are formed as grooves in the grasping portion 28 that do not extend entirely through the first element 22. A guide slot 31 is disposed within each guide 32 and extends entirely through reduced guide portion of the first element 22. It is within the teachings of the present disclosure that the guides 32 may be formed in the first element 22 in any suitable manner. The groove-like configuration of the guides 32 provides additional support for the gripping elements 26 in that the floor 33 of the guides, in which the guide slots 31 are formed provides an additional guide surface for the gripping elements 26 and facilitates resistance to twisting of the gripping elements 26.

The gripping elements 26 each include a body portion 34, adapted for engaging the work piece and arm portion 36, configured to engage one of the guides 32 and associated guide floor 33, and a force transfer element 38 contiguous with or preferably connected to the arm portion 36. It is within the teachings of the present disclosure that the gripping elements 26 may be formed in any suitable manner or configuration and that the force transfer element be configured in any suitable manner. For example, the force transfer element may be a threaded fastener, rivet, pin, shaft, connector or any other suitable device to perform the intended function. The second element 24 further includes an actuation portion 42, formed substantially as and commonly referred to as a head of a tool, disposed at one end of the second grasping portion 25 having a plurality of slots 46 formed therein. In one embodiment, each of the slots 46 has a first section 48 configured to engage one of the force transfer elements 38 such that movement of the second element 24 with respect to the first element 22 simultaneously actuates the first sections 48 to contact the force transfer elements 38 along a path defined by the first section thereby actuating the gripping elements 26 along the guides 32 and guide slots 33.

It will be recognized by those of skill in the art that the first sections define a path which generally decreases in radially measurement from a center of an actuation portion 42 from a first outer end to a second inner end. In another embodiment, the paths may generally increase in terms of radially measurement from the center of the actuation portion 42, such that relative movement between first and second elements generates an outer motion of the gripping elements originally disposed adjacent center of the actuation portion or gripping portion. Alternatively, the guides, slots, and force transfer elements may be configured to interact in any number of different ways to move the gripping or work piece engaging element.

In this embodiment, the body portion 34 include an extension 100 to facilitate increased area of the body portion for gripping the work piece. In one embodiment, the first element 22 may further include a plurality of aligning elements 58 for engaging a second section of the slots. Each aligning element 58 is disposed between adjacent pair of guides 32 and extends parallel to the fourth transfer element 38 and may be configured as the force transfer elements to provide the intended function. The remaining structural and functional elements and aspects of this embodiment of the present disclosure may be configured as any of the like structure and functional aspects of the other embodiments disclosed herein.

FIG. 39 is an exploded view and FIG. 40 is a top plan view of another embodiment of an adjustable gripping tool 20 in accordance with the principal aspects of the present disclosure. In this embodiment, the second element 24 includes a pair of second elements. Each of these second elements 24 includes an actuation portion 42 including at least one slot 46 having a first section 48.

The second element 24 further includes a grasping portion 25 operatively coupled to the first element 22. In this embodiment, a rivet, fastener or other suitable or like device 200 engages the generally aligned apertures 202 of the first and second elements to operatively couple the grasping portion 25 to the first element 22. It is within the teachings of the present invention that any other suitable device may be used to provide such operative coupling as will be recognized by one of skill in the art.

The grasping portion 25 is operatively associated with the actuation portion 42 in meshing engagement. In this embodiment, meshing engagement is defined by cooperative contact between at least one tooth 204 and at least one groove 206. It is within the teaching of the present invention that any number of cooperative tooth and groove combinations may be used. For example, in one embodiment one tooth or groove may be formed on the grasping portion 25 and a complimentary groove or tooth may be formed on the actuation portion 42. In another example, a plurality of teeth or grooves may be formed on the grasping portion 25 and a complimentary groove or teeth may be formed on the actuation portion 42. Furthermore, it is within the teachings of the present disclosure that gear multiplication/leverage or other mechanical advantage may be designed into such meshing engagement and that any suitable structure to provide the functionality of mechanical leverage for advantage may be used. For example, in one embodiment, different gear ratios may be used to facilitate the desired advantage. The remaining structural and functional elements and aspects of this embodiment of the present disclosure may be configured as any of the like structure and functional aspects of the other embodiments disclosed herein.

FIG. 41 is a top plan view of another embodiment of adjustable gripping tool 20 in accordance with the principal aspects of the present disclosure. The adjustable gripping tool 20, as shown in FIG. 41, is disposed in a first operative position. FIG. 42 is another top plan view of the embodiment of the adjustable gripping tool 20 of FIG. 41 wherein the adjustable gripping tool 20 is disposed in a second operative position. FIG. 43 is an exploded view of the adjustable gripping tool 20 of FIGS. 41 and 42. In this embodiment, the adjustable gripping tool 20 primarily includes a second element 24 that includes a pair of second elements. Each of the second elements 24 includes an actuation portion 42 including at least one slot 46 having a first section 48. Each at least one slot first section 48 formed in one of the pair of second elements 210 defines a one path 212 and each at least one slot for section 48 formed in another of the pair of second elements 214 defines another path 216. The one path 212 has a generally clockwise orientation, in that, as the path extends from an inner end to an outer end, such extension is generally in the direction of clockwise. The another path 216 has a generally counter-clockwise orientation, in that, as the path extends from an inner end to an outer end, such extension is generally in the direction of counter-clockwise. As best shown in FIGS. 41 and 42, the one path 212 and the another path 216 cooperatively engage the force transfer element of one said at least one gripping element 26 to actuate each said at least one gripping element 26 along respective said at least one guide 32. It is within the teachings of the present invention that the orientation of the paths defined above is not limiting in any sense, rather such description is a useful for explaining the functional aspects of this embodiment. Essentially, the paths extending in different directions yet cooperatively acting on the force transfer element facilitate increased mechanical advantage against the force transfer element and hence the gripping elements. Accordingly, a more secure grip can be achieved thereby. The remaining structural and functional elements and aspects of this embodiment of the present disclosure may be configured as any of the like structure and functional aspects of the other embodiments disclosed herein.

FIG. 44 is a top plan view of another embodiment of an adjustable gripping tool 20 in accordance with the principal aspects of the present disclosure. The adjustable gripping tool, as shown in FIG. 44, is disposed in a first operative position. FIG. 45 is another top plan view of the embodiment of the adjustable gripping tool 20 of FIG. 44 shown disposed in a second operative position. FIG. 46 is an exploded view of the adjustable gripping tool 20 of FIGS. 44 and 45. In this embodiment, the adjustable gripping 20 includes a one second element 24A and an another second element 24B connected for relative movement which generates movement of at least one gripping element 26. Each at least one gripping element 26 includes a body portion 34 and a force transfer element 38 contiguous with the body portion 34. The one second element 24A and the another second element 24B each include an actuation portion 42 including at least one slot 46 having a first section 48. Each at least one slot first section 48 formed in the one second element 24A defines a one path 212 and each at least one slot first section 48 formed in another second element 24B defines another path 216. The one path 212 and the another path 216 cooperatively engage the force transfer element 38 of one said at least one gripping element 26 to actuate each said at least one gripping element 26 into engagement with the work piece. In this embodiment, the one path has a generally clockwise orientation and the another path 216 has a generally counter-clockwise orientation. It would be recognized by those of ordinary skill in the art that the orientation of either of the paths may be reversed to facilitate any desired function. The remaining structural and functional elements and aspects of this embodiment of the present disclosure may be configured as any of the like structure and functional aspects of the other embodiments disclosed herein.

This disclosure is not limited to the details of the apparatus depicted and other modification and applications may be contemplated. For example, the force transfer elements and aligning elements may be changed as desired for other like bearing elements. The gripping elements themselves may be varied in size, shape, surface finish, body configuration, arm configuration or quantity. And the gripping elements may have a cutter, roller or blade attached to perform cutting or scoring operations. Also, the size, shape and position of the openings may be altered as desired to suit particular applications. Further, the first and second elements, gripping elements and other components of the various embodiments of the gripping tool described above may be formed from any suitable material, including without limitation, metal, plastic, composite, natural, synthetic or any other material. Certain other changes may be made in the above-described apparatus without departing from true spirit and scope of the disclosure here involved. It is intended, therefor that the subject matter of the above depiction shall be interpreted as illustrated and not in a limiting sense. The actual scope of the disclosure is intended to be defined in the following claims when viewed in their proper perspective based on the related art.

What is claimed is:

1. An adjustable gripping tool for engaging a work piece to impart work thereto, the tool comprising:
    (a) a first element and a second element connected for relative movement which generates movement of at least one gripping element;
    (b) the first element including a gripping portion configured to engage the work piece including at least one guide defined in the gripping portion and said at least one gripping element;
    (c) each at least one gripping element including a body portion adapted for engaging the work piece, an arm portion configured to engage one said at least one guide and a force transfer element contiguous with the arm portion;
    (d) the second element including an actuation portion having at least one slot therein, each said at least one slot having a first section configured to engage the force transfer element of one said at least one gripping element, such that movement of the second element with respect to the first element actuates each at least one first section to contact and move each respective force transfer element thereby actuating each said at least one gripping element along respective said at least one guide, wherein the first element further includes at least one aligning element such that each said at least one aligning element is disposed between an adjacent pair of guides and extends parallel to the force transfer elements.

2. The gripping tool as recited in claim 1, wherein the first element includes a pair of elements disposed on opposing sides of the second element.

3. The gripping tool as recited in claim 1, wherein the arm portion of the gripping elements further includes a pair of arms disposed at opposite ends of the body portion such that the gripping elements are substantially U-shaped.

4. The gripping tool as recited in claim 1, wherein at least one of the slots further includes a second section extending from the first section, such that one said at least one aligning element engages one of the second sections so that during relative movement between the first element and the second element the first and second elements remain generally aligned.

5. The gripping tool as recited in claim 4, wherein the first and second sections are divergent.

6. The gripping tool as recited in claim 1, wherein the gripping elements which perform one function may be replaced with gripping elements that perform a different function.

7. The gripping tool as recited in claim 1, wherein the gripping elements score and cut.

8. The gripping tool as recited in claim 1, wherein movement of said at least one gripping element is linear.

9. The gripping tool as recited in claim 1, wherein movement of said at least one gripping element is curvilinear.

10. The gripping tool as recited in claim 1, wherein each said at least one guide extends radially.

11. The gripping tool as recited in claim 1, wherein each said at least one guide extends along a curvilinear path.

12. The gripping tool as recited in claim 1, wherein each at least one gripping element is configured as a cutting wheel that movably engages the work piece to facilitate severing of the work piece by movement of the tool about the work piece after movement of the second element with respect to the first element.

13. The gripping tool as recited in claim 1, wherein each at least one gripping element includes an extension that projects from the gripping element to engage an interior of the work piece.

14. The gripping tool as recited in claim 13, wherein said at least one gripping element is configured to engage a first dimensioned work piece with the first and second elements disposed in a first operative position and a second dimensioned work piece with the first and second elements disposed in a second operative position, such that the first dimensioned work piece is smaller than the second dimensioned work piece.

15. The gripping tool as recited in claim 13, wherein said extension is configured to facilitate a crimping operation.

16. The gripping tool as recited in claim 13, wherein said extension defines a pocket between the extension and the gripping element to receive the work piece.

17. The gripping tool as recited in claim 13, wherein said extension is configured to facilitate chasing threads.

18. The gripping tool as recited in claim 1, wherein each at least one gripping element has a planar configuration.

19. The gripping tool as recited in claim 18, wherein each at least one gripping element has a thickness equivalent to a thickness of the respective associated first element.

20. The gripping tool as recited in claim 1, wherein each at least one gripping element body portion is configured to have a "V" shape where a vertex of the "V" shape is directed toward the force transfer element.

21. The gripping tool as recited in claim 1, wherein a cover plate is connected to the first element to reinforce the tool.

22. The gripping tool as recited in claim 21, wherein the cover plate has a penannular configuration and is attached to the gripping portion.

23. The gripping tools as recited in claim 21, wherein the cover plate has a dimension that is generally equivalent to a first element dimension and is attached over the first element.

24. The gripping tools as recited in claim 21, wherein the cover plate is configured as a receptacle defined by a pair of cover portions offset by a margin portion to engage a pair of first elements.

25. The gripping tool as recited in claim 1, wherein said at least one gripping element is configured to engage a non-standard work piece.

26. The gripping tool as recited in claim 25, wherein the non-standard work piece is a security fastener.

27. The gripping tool as recited in claim 1, wherein said at least one gripping element is configured to cooperatively function to facilitate chasing threads.

28. The gripping tool as recited in claim 1, wherein the first element includes a pair of first elements and a backbone connecting a portion of common edges of the pair of first elements, the pair of first elements and the backbone integrally formed from a unitary blank.

29. The gripping tool as recited in claim 1, wherein the body portion of each at least one gripping element includes an extension that projects from the gripping element to define a second body portion adapted for engaging the work piece such that the body portion facilitates a first range of gripping ability and the second body portion facilitates a second range of gripping ability.

30. The gripping tool as recited in claim 1, wherein the first element and the second element have a penannular configuration.

31. The gripping tool as recited in claim 1, wherein said at least one slot extends partly through the second element.

32. The gripping tool as recited in claim 1, wherein said at least one guide extends partly through the first element.

33. The gripping tool as recited in claim 1, wherein the first element includes a first opening formed in the gripping portion from which the guides extend.

34. The gripping tool as recited in claim 1, wherein the second element includes a second opening formed in the actuation portion such that each said at least one slot is disposed adjacent the second opening external thereto.

35. The gripping tool as recited in claim 1, wherein the first element includes a first opening formed in the gripping portion and the second element includes a second opening formed in the actuation portion such that the first and second openings are generally aligned.

36. The gripping tool as recited in claim 1, wherein the second element further includes a grasping portion operatively coupled to the first element and operatively associated with the actuation portion in meshing engagement.

37. The gripping tool as recited in claim 36, wherein the meshing engagement is defined by cooperative contact between at least one tooth and at least one groove.

38. The gripping tool as recited in claim 1, wherein the second element includes a pair of second elements, each with an actuation portion including at least one slot having a first section, and wherein each at least one slot first section formed in one of the pair of second elements defines a one path and each at least one slot first section formed in another of the pair of second elements defines an another path.

39. The gripping tool as recited in claim 38, wherein the one path has a generally clockwise orientation and the another path has a generally counter-clockwise orientation.

40. The gripping tool as recited in claim 38, wherein the one path and the another path cooperatively engage the force transfer element of one said at least one gripping element to actuate each said at least one gripping element along respective said at least one guide.

41. The gripping tool as recited in claim 1, wherein at least one of said at least one slot includes a third section defined within the first section, such that each gripping element associated with the third section of said at least one of said at least one slot is actuated along respective said at least one guide at a different rate.

* * * * *